United States Patent
Vaidya et al.

(10) Patent No.: US 11,343,283 B2
(45) Date of Patent: May 24, 2022

(54) MULTI-TENANT NETWORK VIRTUALIZATION INFRASTRUCTURE

(71) Applicant: VMware, Inc., Palo Alto, CA (US)

(72) Inventors: Sachin Mohan Vaidya, Pune (IN); Shailesh Makhijani, Pune (IN); Mayur Dhas, Pune (IN); Rushikesh Wagh, Pune (IN); Nikhil Bokare, Pune (IN); Vaibhav Bhandari, Pune (IN); Alka Pendharkar, Pune (IN); Disha Chopra, Palo Alto, CA (US); Pavlush Margarian, Dublin, CA (US); Farzad Ghannadian, Burlingame, CA (US); Shrinivas Sharad Parashar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/103,696

(22) Filed: Nov. 24, 2020

(65) Prior Publication Data
US 2022/0103429 A1 Mar. 31, 2022

(30) Foreign Application Priority Data

Sep. 28, 2020 (IN) ............................. 202041042167

(51) Int. Cl.
*G06F 15/173* (2006.01)
*H04L 29/06* (2006.01)
(Continued)

(52) U.S. Cl.
CPC .............. *H04L 63/20* (2013.01); *G06F 9/455* (2013.01); *G06F 9/45558* (2013.01);
(Continued)

(58) Field of Classification Search
CPC ............. H04L 41/0893; H04L 41/0803; H04L 12/4641; H04L 45/586
See application file for complete search history.

(56) References Cited

U.S. PATENT DOCUMENTS

| 6,219,699 B1 | 4/2001 | McCloghrie et al. |
| 6,347,374 B1 | 2/2002 | Drake et al. |

(Continued)

FOREIGN PATENT DOCUMENTS

| CN | 102124456 A | 7/2011 |
| CN | 102681899 A | 9/2012 |

(Continued)

OTHER PUBLICATIONS

Author Unknown, "Apache Cassandra™ 1.2 Documentation," Jan. 13, 2013, 201 pages, DataStax.

(Continued)

*Primary Examiner* — Wing F Chan
*Assistant Examiner* — Joseph R Maniwang
(74) *Attorney, Agent, or Firm* — Adeli LLP

(57) ABSTRACT

Some embodiments provide a method for a network management and control system that manages a virtual infrastructure deployed across a set of datacenters. Based on input from a top-level user of the virtual infrastructure, the method deploys a first logical network within the virtual infrastructure and defines one or more second-level users of the virtual infrastructure. The method receives input from a second-level user of the virtual infrastructure to define a second logical network and connect the second logical network to the first logical network. The first and second logical networks use a same data model and the second-level users are restricted from viewing configuration of the first logical network.

19 Claims, 28 Drawing Sheets

(51) Int. Cl.
  *G06F 9/455*    (2018.01)
  *H04L 12/46*    (2006.01)
  *H04L 41/0803*  (2022.01)
  *H04L 41/0893*  (2022.01)
  *H04L 45/586*   (2022.01)
  *H04L 49/00*    (2022.01)
  *H04L 67/10*    (2022.01)
  *H04L 12/66*    (2006.01)
  *H04L 45/42*    (2022.01)
  *H04L 45/64*    (2022.01)

(52) U.S. Cl.
  CPC .......... *H04L 12/4641* (2013.01); *H04L 12/66* (2013.01); *H04L 41/0803* (2013.01); *H04L 41/0893* (2013.01); *H04L 45/42* (2013.01); *H04L 45/586* (2013.01); *H04L 45/64* (2013.01); *H04L 49/70* (2013.01); *H04L 63/0209* (2013.01); *H04L 63/0218* (2013.01); *H04L 63/0236* (2013.01); *H04L 63/0263* (2013.01); *H04L 63/10* (2013.01); *H04L 67/10* (2013.01); *G06F 2009/45595* (2013.01)

(56) References Cited

U.S. PATENT DOCUMENTS

| | | |
|---|---|---|
| 7,502,884 B1 | 3/2009 | Shah et al. |
| 7,539,745 B1 | 5/2009 | Wang et al. |
| 7,802,000 B1 | 9/2010 | Huang et al. |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 8,805,971 B1 | 8/2014 | Roth et al. |
| 8,856,077 B1 | 10/2014 | Roth et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,755,965 B1 | 9/2017 | Yadav et al. |
| 9,825,851 B2 | 11/2017 | Agarwal et al. |
| 9,847,938 B2 | 12/2017 | Chanda et al. |
| 9,858,559 B2 | 1/2018 | Raleigh et al. |
| 9,882,968 B1 | 1/2018 | Holgers et al. |
| 9,912,616 B2 | 3/2018 | Shen et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,110,417 B1 | 10/2018 | Hankins et al. |
| 10,120,668 B2 | 11/2018 | Palavalli et al. |
| 10,135,675 B2 | 11/2018 | Yu et al. |
| 10,142,127 B2 | 11/2018 | Cherian et al. |
| 10,162,656 B2 | 12/2018 | Palavalli et al. |
| 10,187,302 B2 | 1/2019 | Chu et al. |
| 10,205,771 B2 | 2/2019 | Palavalli et al. |
| 10,241,820 B2 | 3/2019 | Lambeth et al. |
| 10,243,797 B2 | 3/2019 | Lambeth et al. |
| 10,243,834 B1 | 3/2019 | Shekhar et al. |
| 10,243,846 B2 | 3/2019 | Jiang et al. |
| 10,243,848 B2 | 3/2019 | Agarwal et al. |
| 10,257,049 B2 | 4/2019 | Fried et al. |
| 10,333,959 B2 | 6/2019 | Katrekar et al. |
| 10,339,123 B2 | 7/2019 | Venkatesh et al. |
| 10,382,529 B2 | 8/2019 | Wan et al. |
| 10,560,343 B1 | 2/2020 | Cartsonis et al. |
| 10,579,945 B2 | 3/2020 | Gaurav et al. |
| 10,581,755 B2 | 3/2020 | Jain et al. |
| 10,601,705 B2 | 3/2020 | Hira et al. |
| 10,637,800 B2 | 4/2020 | Wang et al. |
| 10,673,752 B2 | 6/2020 | Agarwal et al. |
| 10,693,833 B2 | 6/2020 | Mathew et al. |
| 10,832,224 B2 | 11/2020 | Palavalli et al. |
| 10,862,753 B2 | 12/2020 | Hira et al. |
| 10,880,158 B2 | 12/2020 | Lambeth et al. |
| 10,880,170 B2 | 12/2020 | Wang et al. |
| 10,897,420 B1 | 1/2021 | Pianigiani et al. |
| 10,908,938 B2 | 2/2021 | Palavalli et al. |
| 10,942,788 B2 | 3/2021 | Palavalli et al. |
| 10,999,154 B1 | 5/2021 | Ahrenholz et al. |
| 11,057,275 B1 | 7/2021 | Arunachalam et al. |
| 11,088,902 B1 | 8/2021 | Palavalli et al. |
| 11,088,916 B1 | 8/2021 | Chandrashekhar et al. |
| 11,088,919 B1 | 8/2021 | Chandrashekhar et al. |
| 11,115,301 B1 | 9/2021 | Margarian et al. |
| 11,153,170 B1 | 10/2021 | Chandrashekhar et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0052257 A1 | 3/2004 | Abdo et al. |
| 2004/0098447 A1 | 5/2004 | Verbeke et al. |
| 2005/0114862 A1 | 5/2005 | Bisdikian et al. |
| 2005/0190757 A1 | 9/2005 | Sajassi |
| 2005/0235352 A1 | 10/2005 | Staats et al. |
| 2005/0288040 A1 | 12/2005 | Charpentier et al. |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193252 A1 | 8/2006 | Naseh et al. |
| 2006/0221720 A1 | 10/2006 | Reuter |
| 2006/0251120 A1 | 11/2006 | Arimilli et al. |
| 2006/0287842 A1 | 12/2006 | Kim |
| 2007/0008884 A1 | 1/2007 | Tang |
| 2007/0058631 A1 | 3/2007 | Mortier et al. |
| 2007/0130295 A1 | 6/2007 | Rastogi et al. |
| 2007/0171921 A1 | 7/2007 | Wookey et al. |
| 2007/0217419 A1 | 9/2007 | Vasseur |
| 2007/0219653 A1 | 9/2007 | Martin |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0268847 A1 | 10/2008 | Mukherjee et al. |
| 2008/0301379 A1 | 12/2008 | Pong |
| 2009/0037367 A1 | 2/2009 | Wein |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085569 A1 | 4/2011 | Gnanasekaran et al. |
| 2011/0164752 A1 | 7/2011 | Wainner et al. |
| 2011/0188509 A1 | 8/2011 | Kern et al. |
| 2011/0225293 A1 | 9/2011 | Rathod |
| 2011/0231602 A1 | 9/2011 | Woods et al. |
| 2011/0299413 A1 | 12/2011 | Chatwani et al. |
| 2012/0084406 A1 | 4/2012 | Kumbalimutt |
| 2012/0089845 A1 | 4/2012 | Raleigh |
| 2012/0120964 A1 | 5/2012 | Koponen et al. |
| 2012/0147898 A1 | 6/2012 | Koponen et al. |
| 2012/0185913 A1 | 7/2012 | Martinez et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |

(56) References Cited

U.S. PATENT DOCUMENTS

| | | | |
|---|---|---|---|
| 2013/0044641 A1 | 2/2013 | Koponen et al. | |
| 2013/0044761 A1* | 2/2013 | Koponen | H04L 12/66 370/401 |
| 2013/0058250 A1 | 3/2013 | Casado et al. | |
| 2013/0058335 A1 | 3/2013 | Koponen et al. | |
| 2013/0058350 A1 | 3/2013 | Fulton | |
| 2013/0058354 A1 | 3/2013 | Casado et al. | |
| 2013/0058358 A1 | 3/2013 | Fulton et al. | |
| 2013/0060819 A1 | 3/2013 | Lambeth et al. | |
| 2013/0060940 A1 | 3/2013 | Koponen et al. | |
| 2013/0060945 A1 | 3/2013 | Allam et al. | |
| 2013/0074065 A1 | 3/2013 | McNeeney et al. | |
| 2013/0103817 A1 | 4/2013 | Koponen et al. | |
| 2013/0125120 A1 | 5/2013 | Zhang et al. | |
| 2013/0132533 A1 | 5/2013 | Padmanabhan et al. | |
| 2013/0132561 A1 | 5/2013 | Pasala et al. | |
| 2013/0144992 A1 | 6/2013 | Barabash et al. | |
| 2013/0159637 A1 | 6/2013 | Forgette et al. | |
| 2013/0212212 A1 | 8/2013 | Addepalli et al. | |
| 2013/0215769 A1 | 8/2013 | Beheshti-Zavareh et al. | |
| 2013/0232480 A1 | 9/2013 | Winterfeldt et al. | |
| 2013/0254328 A1 | 9/2013 | Inoue et al. | |
| 2013/0262685 A1 | 10/2013 | Shelton et al. | |
| 2013/0282994 A1 | 10/2013 | Wires et al. | |
| 2013/0286833 A1 | 10/2013 | Torres et al. | |
| 2013/0287026 A1 | 10/2013 | Davie | |
| 2013/0301425 A1 | 11/2013 | Udutha et al. | |
| 2013/0301501 A1 | 11/2013 | Olvera-Hernandez et al. | |
| 2013/0304616 A1 | 11/2013 | Raleigh et al. | |
| 2013/0308641 A1 | 11/2013 | Ackley | |
| 2014/0006465 A1 | 1/2014 | Davis et al. | |
| 2014/0059544 A1 | 2/2014 | Koganty et al. | |
| 2014/0064104 A1 | 3/2014 | Nataraja et al. | |
| 2014/0075002 A1 | 3/2014 | Pradhan et al. | |
| 2014/0098671 A1 | 4/2014 | Raleigh et al. | |
| 2014/0129719 A1 | 5/2014 | Weber et al. | |
| 2014/0136908 A1 | 5/2014 | Maggiari et al. | |
| 2014/0146817 A1 | 5/2014 | Zhang | |
| 2014/0172740 A1 | 6/2014 | McCormick et al. | |
| 2014/0172939 A1 | 6/2014 | McSherry et al. | |
| 2014/0201218 A1 | 7/2014 | Catalano et al. | |
| 2014/0208150 A1* | 7/2014 | Abuelsaad | G06F 11/0781 714/2 |
| 2014/0211661 A1 | 7/2014 | Gorkemli et al. | |
| 2014/0241356 A1 | 8/2014 | Zhang et al. | |
| 2014/0250220 A1 | 9/2014 | Kapadia et al. | |
| 2014/0269435 A1 | 9/2014 | McConnell et al. | |
| 2014/0301391 A1 | 10/2014 | Krishnan et al. | |
| 2014/0304355 A1 | 10/2014 | Kamath et al. | |
| 2014/0337500 A1 | 11/2014 | Lee | |
| 2014/0351396 A1 | 11/2014 | Stabile et al. | |
| 2014/0372533 A1 | 12/2014 | Fu et al. | |
| 2015/0009797 A1 | 1/2015 | Koponen et al. | |
| 2015/0009808 A1 | 1/2015 | Bejerano et al. | |
| 2015/0016276 A1 | 1/2015 | Decusatis et al. | |
| 2015/0063364 A1 | 3/2015 | Thakkar et al. | |
| 2015/0067171 A1 | 3/2015 | Yum et al. | |
| 2015/0085862 A1 | 3/2015 | Song | |
| 2015/0100704 A1 | 4/2015 | Davie et al. | |
| 2015/0103842 A1 | 4/2015 | Chandrashekhar et al. | |
| 2015/0103843 A1 | 4/2015 | Chandrashekhar et al. | |
| 2015/0106804 A1 | 4/2015 | Chandrashekhar et al. | |
| 2015/0117216 A1 | 4/2015 | Anand et al. | |
| 2015/0117256 A1 | 4/2015 | Sabaa et al. | |
| 2015/0154330 A1 | 6/2015 | Yachide et al. | |
| 2015/0195126 A1 | 7/2015 | Vasseur et al. | |
| 2015/0229641 A1 | 8/2015 | Sun et al. | |
| 2015/0237014 A1 | 8/2015 | Bansal et al. | |
| 2015/0263946 A1 | 9/2015 | Tubaltsev et al. | |
| 2015/0312116 A1 | 10/2015 | Taheri et al. | |
| 2015/0312326 A1 | 10/2015 | Archer et al. | |
| 2015/0326467 A1 | 11/2015 | Fullbright et al. | |
| 2016/0057014 A1 | 2/2016 | Thakkar et al. | |
| 2016/0094396 A1 | 3/2016 | Chandrashekhar et al. | |
| 2016/0134528 A1 | 5/2016 | Lin et al. | |
| 2016/0173338 A1 | 6/2016 | Wolting | |
| 2016/0210209 A1 | 7/2016 | Verkaik et al. | |
| 2016/0218918 A1 | 7/2016 | Chu et al. | |
| 2016/0226700 A1 | 8/2016 | Zhang et al. | |
| 2016/0226762 A1 | 8/2016 | Zhang et al. | |
| 2016/0226822 A1 | 8/2016 | Zhang et al. | |
| 2016/0294728 A1 | 10/2016 | Jain et al. | |
| 2016/0352588 A1 | 12/2016 | Subbarayan et al. | |
| 2016/0359705 A1 | 12/2016 | Parandehgheibi et al. | |
| 2016/0373530 A1 | 12/2016 | Duda | |
| 2016/0380815 A1 | 12/2016 | Agarwal et al. | |
| 2016/0380891 A1 | 12/2016 | Agarwal et al. | |
| 2016/0380925 A1 | 12/2016 | Agarwal et al. | |
| 2016/0380973 A1 | 12/2016 | Sullenberger et al. | |
| 2017/0034052 A1 | 2/2017 | Chanda et al. | |
| 2017/0034129 A1 | 2/2017 | Sawant et al. | |
| 2017/0041347 A1 | 2/2017 | Nagaratnam et al. | |
| 2017/0048110 A1 | 2/2017 | Wu et al. | |
| 2017/0048130 A1 | 2/2017 | Goliya et al. | |
| 2017/0063633 A1 | 3/2017 | Goliya et al. | |
| 2017/0063794 A1 | 3/2017 | Jain et al. | |
| 2017/0063822 A1 | 3/2017 | Jain et al. | |
| 2017/0093636 A1 | 3/2017 | Chanda et al. | |
| 2017/0104720 A1 | 4/2017 | Bansal et al. | |
| 2017/0126551 A1 | 5/2017 | Pfaff et al. | |
| 2017/0163532 A1 | 6/2017 | Tubaltsev et al. | |
| 2017/0163598 A1 | 6/2017 | Shen et al. | |
| 2017/0163599 A1 | 6/2017 | Shen et al. | |
| 2017/0171055 A1 | 6/2017 | Wang et al. | |
| 2017/0222873 A1 | 8/2017 | Lee et al. | |
| 2017/0249195 A1 | 8/2017 | Sadana et al. | |
| 2017/0250912 A1 | 8/2017 | Chu et al. | |
| 2017/0257432 A1 | 9/2017 | Fu et al. | |
| 2017/0264483 A1 | 9/2017 | Lambeth et al. | |
| 2017/0288981 A1 | 10/2017 | Hong et al. | |
| 2017/0310641 A1 | 10/2017 | Jiang et al. | |
| 2017/0317954 A1 | 11/2017 | Masurekar et al. | |
| 2017/0317969 A1 | 11/2017 | Masurekar et al. | |
| 2017/0317971 A1 | 11/2017 | Dubey et al. | |
| 2017/0324645 A1 | 11/2017 | Johnsen et al. | |
| 2017/0331711 A1 | 11/2017 | Duda | |
| 2017/0344444 A1 | 11/2017 | Costa-Roberts et al. | |
| 2018/0062880 A1 | 3/2018 | Yu et al. | |
| 2018/0062881 A1 | 3/2018 | Chandrashekhar et al. | |
| 2018/0062923 A1 | 3/2018 | Katrekar et al. | |
| 2018/0062944 A1 | 3/2018 | Altman et al. | |
| 2018/0063036 A1 | 3/2018 | Chandrashekhar et al. | |
| 2018/0063195 A1 | 3/2018 | Nimmagadda et al. | |
| 2018/0123877 A1 | 5/2018 | Saxena et al. | |
| 2018/0123903 A1 | 5/2018 | Holla et al. | |
| 2018/0157537 A1 | 6/2018 | Chen et al. | |
| 2018/0234337 A1 | 8/2018 | Goliya et al. | |
| 2018/0234459 A1 | 8/2018 | Kung et al. | |
| 2018/0309718 A1 | 10/2018 | Zuo | |
| 2019/0014040 A1 | 1/2019 | Yerrapureddy et al. | |
| 2019/0158537 A1 | 5/2019 | Miriyala | |
| 2019/0190780 A1 | 6/2019 | Wang et al. | |
| 2019/0207847 A1 | 7/2019 | Agarwal et al. | |
| 2019/0245888 A1 | 8/2019 | Martinez et al. | |
| 2019/0260610 A1 | 8/2019 | Dubey et al. | |
| 2019/0260630 A1 | 8/2019 | Stabile et al. | |
| 2019/0303326 A1 | 10/2019 | Desai et al. | |
| 2019/0334765 A1 | 10/2019 | Jain et al. | |
| 2019/0342175 A1 | 11/2019 | Wan et al. | |
| 2019/0363975 A1 | 11/2019 | Djernaes | |
| 2019/0379731 A1 | 12/2019 | Johnsen et al. | |
| 2020/0007392 A1 | 1/2020 | Goyal | |
| 2020/0021541 A1 | 1/2020 | Chanda | |
| 2020/0057669 A1 | 2/2020 | Hutcheson et al. | |
| 2020/0076684 A1 | 3/2020 | Naveen et al. | |
| 2020/0106744 A1 | 4/2020 | Miriyala et al. | |
| 2020/0162325 A1 | 5/2020 | Desai et al. | |
| 2020/0169496 A1 | 5/2020 | Goliya et al. | |
| 2020/0177518 A1 | 6/2020 | Jain et al. | |
| 2020/0195607 A1 | 6/2020 | Wang et al. | |
| 2020/0257549 A1 | 8/2020 | Vlaznev et al. | |
| 2020/0296035 A1 | 9/2020 | Agarwal et al. | |
| 2020/0358693 A1 | 11/2020 | Rawlins | |
| 2020/0366741 A1 | 11/2020 | Kancherla et al. | |

(56) References Cited

U.S. PATENT DOCUMENTS

| | | |
|---|---|---|
| 2020/0409563 A1 | 12/2020 | Parasnis et al. |
| 2021/0067556 A1 | 3/2021 | Tahan |
| 2021/0117908 A1 | 4/2021 | Coles et al. |
| 2021/0168197 A1 | 6/2021 | Jones et al. |
| 2021/0194729 A1 | 6/2021 | Semwal et al. |
| 2021/0311960 A1 | 10/2021 | Rogozinsky et al. |
| 2021/0314192 A1 | 10/2021 | Chandrashekhar et al. |
| 2021/0314193 A1 | 10/2021 | Chandrashekhar et al. |
| 2021/0314212 A1 | 10/2021 | Chandrashekhar et al. |
| 2021/0314215 A1 | 10/2021 | Manzanilla et al. |
| 2021/0314219 A1 | 10/2021 | Gujar et al. |
| 2021/0314225 A1 | 10/2021 | Chandrashekhar et al. |
| 2021/0314226 A1 | 10/2021 | Chandrashekhar et al. |
| 2021/0314227 A1 | 10/2021 | Chandrashekhar et al. |
| 2021/0314228 A1 | 10/2021 | Chandrashekhar et al. |
| 2021/0314235 A1 | 10/2021 | Chandrashekhar et al. |
| 2021/0314251 A1 | 10/2021 | Dubey et al. |
| 2021/0314256 A1 | 10/2021 | Chandrashekhar et al. |
| 2021/0314257 A1 | 10/2021 | Chandrashekhar et al. |
| 2021/0314258 A1 | 10/2021 | Chandrashekhar et al. |
| 2021/0314289 A1 | 10/2021 | Chandrashekhar et al. |
| 2021/0314291 A1 | 10/2021 | Chandrashekhar et al. |

FOREIGN PATENT DOCUMENTS

| | | |
|---|---|---|
| CN | 103064744 A | 4/2013 |
| CN | 103650433 A | 3/2014 |
| CN | 103747059 A | 4/2014 |
| CN | 103890751 A | 6/2014 |
| CN | 104123189 A | 10/2014 |
| CN | 110061899 A | 7/2019 |
| EP | 1154601 A1 | 11/2001 |
| EP | 1290856 A2 | 3/2003 |
| EP | 1635506 A1 | 3/2006 |
| EP | 1868318 A1 | 12/2007 |
| EP | 3016331 A1 | 5/2016 |
| EP | 3032412 A1 | 6/2016 |
| EP | 3314831 A1 | 5/2018 |
| EP | 3485610 A1 | 5/2019 |
| WO | 2010028364 A1 | 3/2010 |
| WO | 2012113444 A1 | 8/2012 |
| WO | 2013152716 A1 | 10/2013 |
| WO | 2014066820 A2 | 5/2014 |
| WO | 2015054671 A2 | 4/2015 |
| WO | 2016161394 A1 | 10/2016 |
| WO | 2017003881 A1 | 1/2017 |
| WO | 2018044341 A1 | 3/2018 |
| WO | 2021206785 A1 | 10/2021 |
| WO | 2021206786 A1 | 10/2021 |
| WO | 2021206790 A1 | 10/2021 |

OTHER PUBLICATIONS

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System An Open-Source Distributed SDN OS," Dec. 19, 2013, 34 pages.

Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, The Research Triangle, North Carolina, USA.

Hanna, Jeremy, "How ZooKeeper Handles Failure Scenarios," http://apache.org/hadoop/Zookeeper/Failurescenarios. Dec. 9, 2010, 1 page.

Heller, Brandon, et al., "The Controller Placement Problem," Hot Topics in Software Defined Networks, Aug. 13, 2012, 6 pages, Helsinki, Finland.

Jin, Xin, et al., "Dynamic Scheduling of Network Updates," SIGCOMM'14, Aug. 17-22, 2014, 12 pages, ACM, Chicago, IL, USA.

Krishnaswamy, Umesh, et al., "ONOS Open Network Operating System—An Experimental Open-Source Distributed SDN OS," Apr. 16, 2013, 24 pages.

Lebresne, Sylvain, "[Release] Apache Cassandra 1.2 released," Jan. 2, 2013, 1 page.

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.

Non-Published Commonly Owned U.S. Appl. No. 16/906,889, filed Jun. 19, 2020, 125 pages, VMware, Inc.

Non-Published Commonly Owned U.S. Appl. No. 16/906,891, filed Jun. 19, 2020, 125 pages, VMware, Inc.

Non-Published Commonly Owned U.S. Appl. No. 16/906,893, filed Jun. 19, 2020, 126 pages, VMware, Inc.

Non-Published Commonly Owned U.S. Appl. No. 16/906,901, filed Jun. 19, 2020, 125 pages, VMware, Inc.

Non-Published Commonly Owned U.S. Appl. No. 16/906,902, filed Jun. 19, 2020, 126 pages, VMware, Inc.

Non-Published Commonly Owned U.S. Appl. No. 16/906,905, filed Jun. 19, 2020, 126 pages, VMware, Inc.

Non-Published Commonly Owned U.S. Appl. No. 16/906,908, filed Jun. 19, 2020, 125 pages, VMware, Inc.

Non-Published Commonly Owned U.S. Appl. No. 16/906,913, filed Jun. 19, 2020, 124 pages, VMware, Inc.

Non-Published Commonly Owned U.S. Appl. No. 16/906,921, filed Jun. 19, 2020, 43 pages, VMware, Inc.

Non-Published Commonly Owned U.S. Appl. No. 16/906,925, filed Jun. 19, 2020, 111 pages, VMware, Inc.

Non-Published Commonly Owned U.S. Appl. No. 16/906,929, filed Jun. 19, 2020, 113 pages, VMware, Inc.

Non-Published Commonly Owned U.S. Appl. No. 16/906,934, filed Jun. 19, 2020, 112 pages, VMware, Inc.

Non-Published Commonly Owned U.S. Appl. No. 16/906,935, filed Jun. 19, 2020, 114 pages, VMware, Inc.

Non-Published Commonly Owned U.S. Appl. No. 16/906,942, filed Jun. 19, 2020, 127 pages, VMware, Inc.

Non-Published Commonly Owned U.S. Appl. No. 16/906,944, filed Jun. 19, 2020, 128 pages, VMware, Inc.

Non-Published Commonly Owned U.S. Appl. No. 16/906,950, filed Jun. 19, 2020, 128 pages, VMware, Inc.

Non-Published Commonly Owned U.S. Appl. No. 16/906,955, filed Jun. 19, 2020, 127 pages, VMware, Inc.

Non-Published Commonly Owned U.S. Appl. No. 16/906,960, filed Jun. 19, 2020, 128 pages, VMware, Inc.

Non-Published Commonly Owned U.S. Appl. No. 16/906,964, filed Jun. 19, 2020, 126 pages, VMware, Inc.

Non-Published Commonly Owned U.S. Appl. No. 16/906,966, filed Jun. 19, 2020, 128 pages, VMware, Inc.

Non-Published Commonly Owned Related U.S. Appl. No. 17/103,700 with similar specification, filed Nov. 24, 2020, 80 pages, VMware, Inc.

Non-Published Commonly Owned Related U.S. Appl. No. 17/103,704 with similar specification, filed Nov. 24, 2020, 80 pages, VMware, Inc.

Non-Published Commonly Owned Related U.S. Appl. No. 17/103,706 with similar specification, filed Nov. 24, 2020, 79 pages, VMware, Inc.

Non-Published Commonly Owned Related U.S. Appl. No. 17/103,708 with similar specification, filed Nov. 24, 2020, 79 pages, VMware, Inc.

Non-Published Commonly Owned Related International Patent Application PCT/US2021/042117 with similar specification, filed Jul. 17, 2021, 80 pages, VMware, Inc.

Non-Published Commonly Owned U.S. Appl. No. 17/391,917, filed Aug. 2, 2021, 51 pages, VMware, Inc.

(56) References Cited

OTHER PUBLICATIONS

PCT Invitation to Pay Additional Fees for Commonly Owned International Patent Application PCT/US2021/042117, dated Jan. 10, 2022, 10 pages, International Searching Authority (EPO).

* cited by examiner

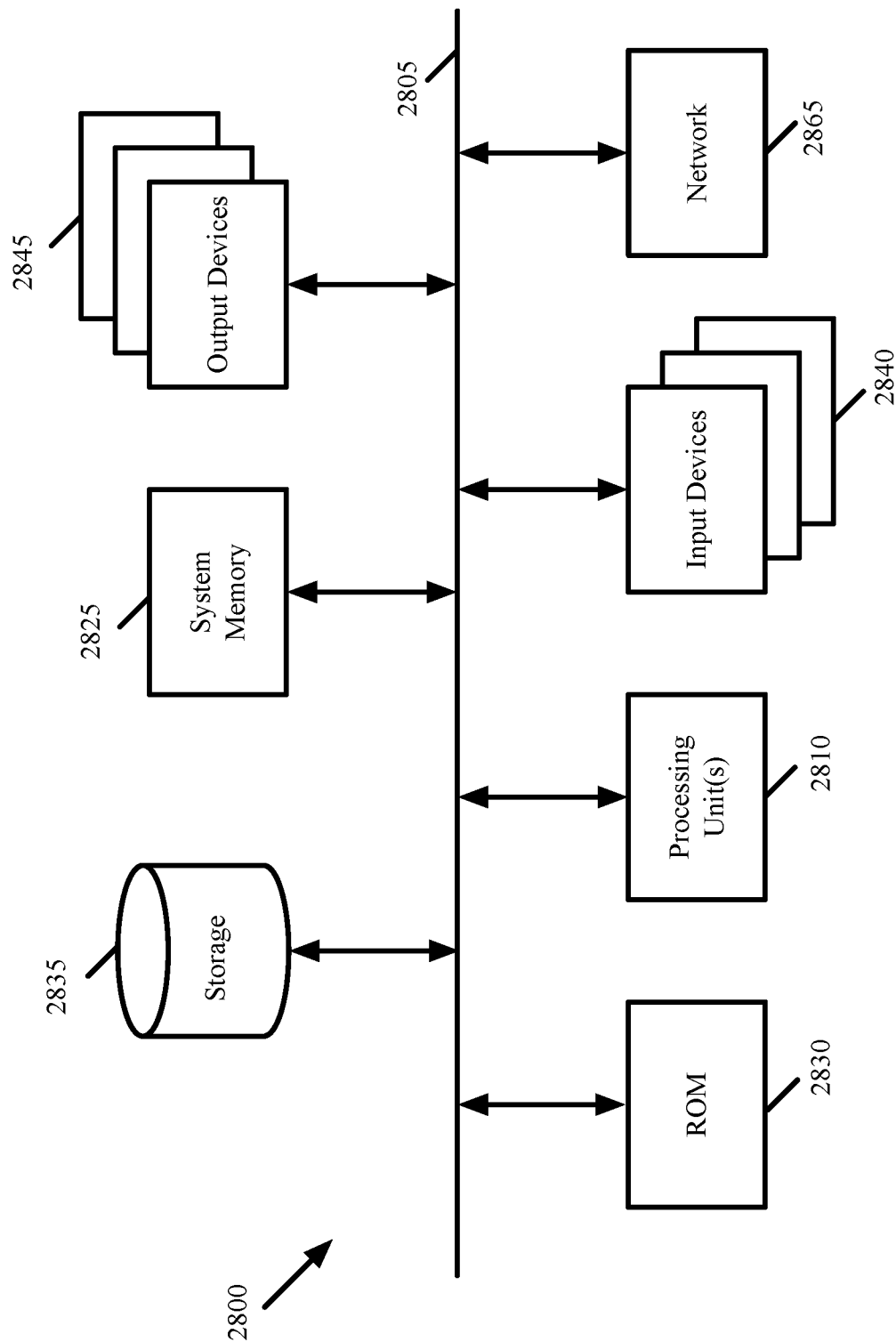

MULTI-TENANT NETWORK VIRTUALIZATION INFRASTRUCTURE

BACKGROUND

As more networks move to the cloud (public, private, or hybrid), it is common for application developers within a corporation or other entity to want to deploy applications that may span these sites. This presents various challenges for the network administrators (e.g., the IT team for a corporation). In current systems, an application developer either has to be made aware of the security and networking configurations in order to deploy the application themselves, or work with the network admins to have the application deployed within the network. Various solutions are required to solve these issues.

BRIEF SUMMARY

Some embodiments of the invention provide a network management system for managing a virtualization infrastructure having one or more logical networks defined across one or more sites (e.g., datacenters). The network management system allows for a top-level user of the virtual infrastructure (e.g., a cloud provider, an enterprise's network administrators) to define a provider logical network and to define one or more second-level users (e.g., tenants, enterprise organizational units) of the virtualization infrastructure. These second-level users can in turn define accounts for different users. Specifically, a second-level user can define security and networking configuration (e.g., logical networking constructs, security zones) that is opaque to third-level users (e.g., application developers) as well as other second-level users. Application developers can specify their application requirements, without any knowledge of the security and networking configuration, and the network management system of some embodiments automatically deploys the application according to the requirements while ensuring that the security and networking policies are adhered to.

As mentioned, the top-level user defines a provider logical network (this logical network will be referred to herein as a provider logical network irrespective of whether the top-level user is a cloud provider, enterprise network admin, etc.). In some embodiments, this provider logical network is defined using a particular data model, such as a hierarchical policy tree with nodes and connections between the nodes. Through the data model, the top-level user can define security policies and security groups as well as logical network elements (e.g., logical routers and/or logical switches). In addition, in some embodiments, the provider data model includes a definition of the physical infrastructure onto which the virtualization infrastructure is deployed. This physical infrastructure of some embodiments may specify the multiple federated sites across which the virtualization infrastructure is deployed, as well as groups of physical elements within that site (e.g., groups of edge devices that physically connect to external networks in each site, zones of physical servers and/or forwarding elements within each site).

The second-level users (referred to herein as tenants), in some embodiments, are granted the ability to define their own security and networking configuration, as well as to use certain entities exposed by the provider network. Though these provider network entities may be exposed to tenant users, the tenant users are restricted from viewing or editing the configuration of the provider network (including these entities). In addition, to provide isolation between users, one tenant user is restricted from viewing (or modifying) the configuration of any other tenant users. That is, each tenant is provided with the ability to view and modify only their own configuration, and not that of any other tenants or the higher-level provider user. Within a tenant's configuration, sub-users can be created that can define their own isolated configuration (which may be linked to the tenant or provider configurations, in some embodiments). Each of these isolated configurations may be referred to as a virtual hybrid cloud (VHC); as described further below, each VHC may be isolated to a single site or spread across multiple physical sites (e.g., a combination of enterprise on-prem datacenters, branch offices, and public clouds).

In some embodiments, the data model for the tenant configuration is similar to that for the provider configuration. That is, the tenant configuration is also represented (e.g., in storage of the network management system) as a hierarchical policy tree with similar nodes and connections. One difference, however, is that in some embodiments only the provider user policy tree includes the physical infrastructure nodes defining sites and groups of physical computing devices within a site. That is, some embodiments prevent the tenant users from both viewing or configuring the provider physical infrastructure nodes and from defining their own physical infrastructure policy.

In addition, the API is similar for the tenant user and for the provider user when defining (e.g., creating, modifying) the same type of entity. For instance, the tenant administrator may define security policies and security groups as well as logical network elements. In some embodiments, tenant users (and/or sub-users of the tenant) can define a logical network including logical switches to which data compute nodes (e.g., virtual machines (VMs), containers, etc.) connect and logical routers that connect these logical switches to each other. As described further below, the data compute nodes (DCNs) may implement applications deployed in the tenant logical network in some embodiments.

In some embodiments, logical routers can be either tier-0 (T0) logical routers that provide a connection to external networks or tier-1 (T1) logical routers that (i) connect logical switches to each other, (ii) provide services (e.g., firewall, load balancing, etc.), and (iii) enable connections to T0 logical routers. Some embodiments only allow the provider user to define T0 logical routers, so that the provider user (e.g., the enterprise IT team) can oversee all of the rules regarding external connections to the virtualization infrastructure (e.g., routing protocols for route exchange with external routers, virtual private network (VPN) connections, etc.). The provider user can define multiple virtual routing and forwarding tables (VRFs) for a single T0 router in some embodiments. The tenant user, on the other hand, can only define T1 logical routers in some embodiments. In other embodiments, when a tenant user is created by the provider, an isolated VHC is automatically created with a T0 VRF specific to the tenant. The tenant user can manage this T0 VRF and define services such as routing protocols (e.g., BGP, OSPF) and VPNs, while isolating this configuration from any sub-users.

All types of users (providers, tenants, sub-users) may define security policy for their respective VHCs in some embodiments. This security policy may include, in some embodiments, security rules (e.g., distributed firewall rules and/or gateway firewall rules), security group definitions, and domains. Domains, in some embodiments, are logical groupings of one or more sites (e.g., within a similar geographic regions) that serve as an envelope to group different logical entities together (e.g., for security purposes). For example, firewall policies or other policy microsegmentation applied to the domain will automatically be applied to all groups of logical endpoints defined within the domain in some embodiments. Security groups, in some embodiments, are groups of logical network endpoints that share one or more attributes (e.g., operating system, region, application tier, etc.). The user (provider or tenant) can apply security rules to a security group, and the network management and control system translates these security rules into rules applied to each DCN in the security group. In some embodiments, the security rules and groups are defined within domains.

While the tenant users cannot configure or view the configuration of entities defined within the provider VHC, some embodiments allow the provider user to expose some of these entities for use by the tenant users. In some embodiments, the provider user exposes these entities to one or more tenants via labels, which allow the tenant user to identify the type of entity and any specific properties of import, but not to view or modify the full configuration of the entity. For instance, a provider user might expose a T0 logical router or simply a VRF of a T0 logical router to which the tenant user (or its sub-users) can connect their T1 logical routers. The label might indicate the sites spanned by the T0 logical router, but not the VLAN segments connected to the T0 logical router or its routing protocol configuration. Other types of entities that a provider user might expose via labels include security groups that the tenant user can use to define firewall rules (with the tenant user aware of the attributes that cause a DCN to belong to the security group, but not the full membership of the group outside of the tenant VHC), edge clusters (a physical infrastructure grouping of devices for implementing centralized routing components of logical routers) that the tenant user can use for T1 logical routers, as well as services such as load balancers.

As mentioned, in addition to being provided with the ability to configure their own isolated logical network and security policy in a VHC, each tenant user can define additional sub-users, who in turn can define their own isolated logical network and security policy within a VHC. For instance, if a tenant is a line of business within an enterprise, then sub-users may be defined for different organizational units within that business line, etc. Similarly, if a tenant is a public cloud tenant, then the sub-users might be different business lines within the scope of the tenant. In addition, tenant users (or sub-users) may define accounts for application developers. In some embodiments, application developer users may not view or configure their own logical networking and security rules (i.e., they are not granted their own VHC), but rather can define applications within the scope of a particular VHC. The implementation of these applications within a VHC is described further below.

Tenant users and their sub-users can also define security zones in some embodiments. In some embodiments, security zones are defined to govern the connectivity (or other security policies) of applications. That is, DCNs implementing an application are assigned to security zones, and the connectivity and/or other security policies of the security zone are applied to those DCNs. In some embodiments, the user defining a security zone defines the span of that security zone in terms of sites (of the provider's physical infrastructure), thereby restricting applications (or tiers of applications) assigned to the security zone to those sites. Examples of common security zones include a first zone that allows connections from external endpoints (often referred to as a DMZ), as well as a second zone that does not allow connections from external endpoints but does allow incoming connections from the first zone (often referred to as a production zone, and with which back-end servers or application tiers may be associated).

As mentioned, application developer users can be provided with the ability to define an application within a VHC, without the ability to view or edit the networking and security configurations for the VHC. In some embodiments, application developers specify a set of connectivity requirements for an application. Based on these requirements, the network management and control system automatically assigns the DCNs that implement the application to the security zones defined for the VHC.

The applications are defined as sets of application tiers in some embodiments. For instance, applications are commonly specified as 3-tier applications, with a web tier of web servers that accept incoming connections from external endpoints, an application tier, and a back-end database tier. The network management and control system assigns each of these defined application tiers to one of the security zones defined for the VHC based on the requirements (e.g., connectivity requirements). For instance, a web tier that requires incoming connections from external client endpoints would be assigned to the DMZ, while a back-end database tier that requires incoming connections from the web tier but not from external client endpoints would be assigned to the production zone. Applications might also specify connection requirements to other non-application DCNs within the tenant network, such as backup servers. So long as these non-application DCNs are assigned to the appropriate security zone (e.g., the production zone), the connections from application DCNs are allowed (even if these non-application DCNs are in a different VHC than the application).

Each VHC spans a set of the sites of the physical infrastructure, and part of the application specification in some embodiments is a set of the sites of the application's VHC across which to deploy the application. As described above, each application tier is assigned to a security zone, and that security zone spans a set of sites. Thus, each application tier is assigned to a subset of the sites designated for the application that is the intersection of (i) the sites designated for the application and (ii) the sites to which the security zone for that application tier is restricted. That is, the DCNs implementing the application tier are deployed within that subset of sites. If there is no overlap between the sites designated for an application and the sites to which a security zone for a tier of the application is restricted, some embodiments generate an error and alert the application developer user of the error so that the application developer can designate a different set of sites for the application.

As part of assigning application tiers to security zones, the network management and control system of some embodiments also automatically populates various sets of firewall rules to implement the security zones for the application. For instance, for internal connections (e.g., for connections from the DMZ to the production zone), some embodiments automatically populate distributed firewall rules to allow these specific connections. These distributed firewall rules are implemented by the internal physical infrastructure (e.g., managed forwarding elements and/or firewall modules in virtualization software of host computers), as configured by the network management and control system.

In addition, if the application has connectivity to external networks (e.g., if the application requires connections from external endpoint clients), some embodiments auto-populate gateway (edge) firewall rules associated with a centralized routing component of a logical router. In some embodiments, these gateway firewall rules are arranged in sections. The firewall rules have relative priorities within a section, and the sections have different priorities as well, so that the highest priority rule in the highest priority section is the highest priority rule overall. The primary (highest priority) section in some embodiments is created and managed by the user that governs the logical router—e.g., the provider for a T0 logical router, or a tenant user for a T1 logical router.

For applications that require incoming connections, the firewall rules should be configured to allow connections in for that application, but not such that all incoming traffic is allowed at the gateway. Thus, some embodiments have a default rule denying incoming connections, but include a higher priority rule that specifies to skip (jump) to a different firewall rule section specific to the application if the incoming connection is directed to the application (e.g., based on a destination address and/or transport layer port in the packet, or a determination that the packet is directed to a particular logical port of the logical router). The application-specific firewall rule section has rules configured specifically for the application, typically along with another default rule denying connections that do not meet the specific required characteristics for the application. For instance, the application firewall rules might allow any incoming connections addressed correctly to the application, only allow incoming connections from certain addresses, etc.

In addition to assigning application tiers to security zones and defining firewall rules for the applications, some embodiments automatically generate logical networking constructs based on the application definition. Specifically, some embodiments allow the user that defines a VHC to define application association policies for the VHC. An application association policy, in some embodiments, specifies how an application with tiers is translated into logical network entities. For instance, an application association policy might automatically define a separate logical switch for each application tier, along with a T1 logical router that connects these new logical switches. If the T1 logical router has centralized services requiring the use of an edge gateway, then some embodiments automatically use an edge device located in an edge cluster (part of the physical infrastructure nodes of the provider policy tree) associated with the VHC in which the application is defined. If the application requires external connections (e.g., from external client endpoints or to internal backup servers located in a different VHC), then some embodiments automatically connect the T1 logical router to a particular T0 logical router that is exposed to the VHC. Rather than defining a separate logical switch for each tier, an application association policy could assign all of the tiers (i.e., all of the DCNs implementing the tiers) to the same logical switch. In this case, some embodiments differentiate the tiers using compute expressions (e.g., assigning tags or other metadata to the DCNs implementing the different tiers).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 28 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network management system for managing a virtualization infrastructure having one or more logical networks defined across one or more sites (e.g., datacenters). The network management system allows for a top-level user of the virtual infrastructure (e.g., a cloud provider, an enterprise's network administrators) to define a provider logical network and to define one or more second-level users (e.g., tenants, enterprise organizational units) of the virtualization infrastructure. These second-level users can in turn define accounts for different users. Specifically, a second-level user can define security and networking configuration (e.g., logical networking constructs, security zones) that is opaque to third-level users (e.g., application developers) as well as other second-level users. Application developers can specify their application requirements, without any knowledge of the security and networking configuration, and the network management system of some embodiments automatically deploys the application according to the requirements while ensuring that the security and networking policies are adhered to.

These logical networks, in some embodiments, are conceptual network structures that the irrespective user accounts define through the network management system. As mentioned, the top-level user defines a provider logical network (this logical network will be referred to herein as a provider logical network irrespective of whether the top-level user is a cloud provider, enterprise network admin, etc.). In some embodiments, this provider logical network is defined using a particular data model, such as a hierarchical policy tree with nodes and connections between the nodes. Through the data model, the top-level user can define security policies and security groups as well as logical network elements (e.g., logical routers and/or logical switches). In addition, in some embodiments, the provider data model includes a definition of the physical infrastructure onto which the virtualization infrastructure is deployed. This physical infrastructure of some embodiments may specify the multiple federated sites across which the virtualization infrastructure is deployed, as well as groups of physical elements within that site (e.g., groups of edge devices that physically connect to external networks in each site, zones of physical servers and/or forwarding elements within each site).

Figure 1:
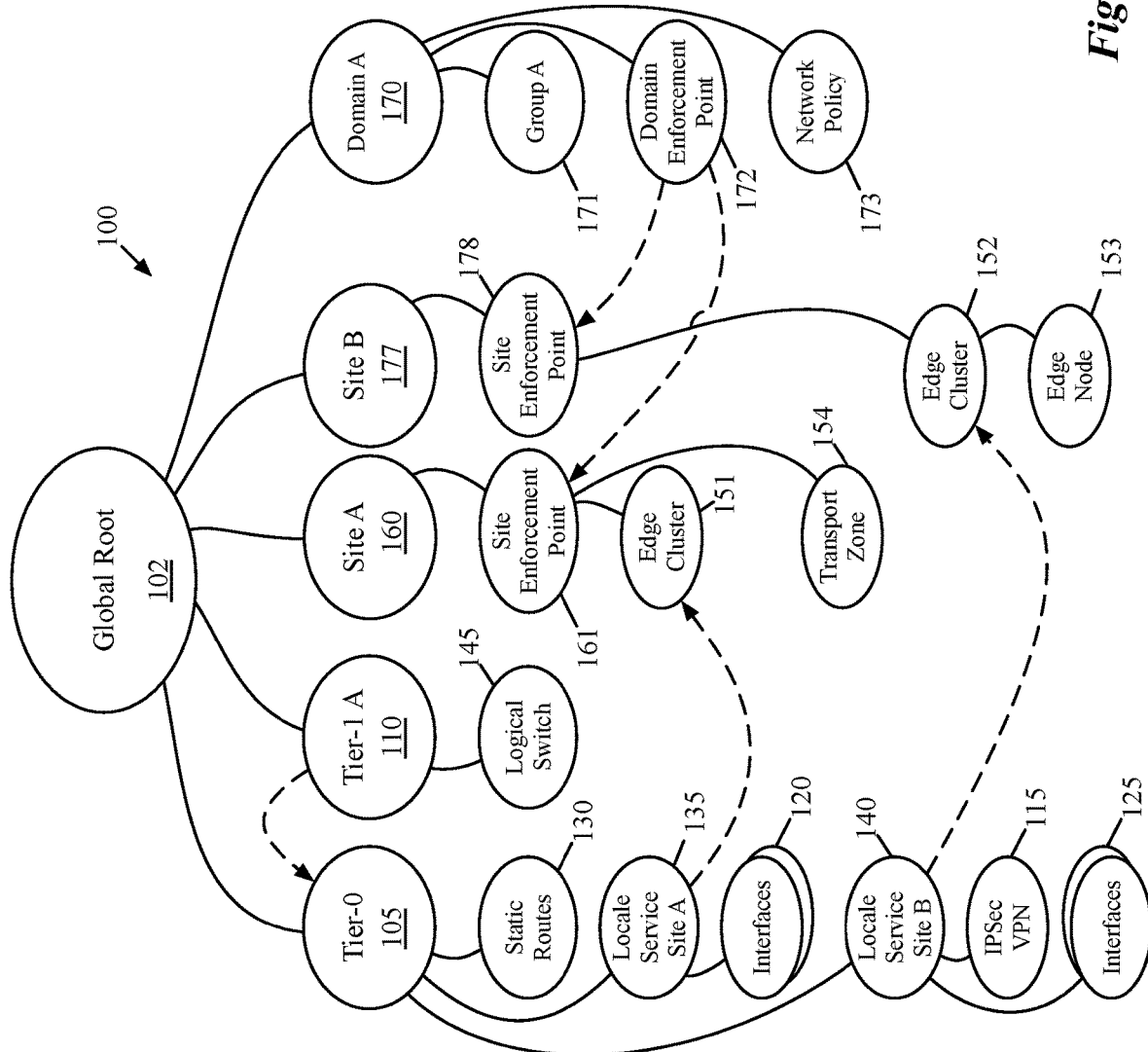
FIG. 1 conceptually illustrates an example of a hierarchical policy tree for a provider logical network that spans multiple sites.

FIG. 1 conceptually illustrates an example of such a hierarchical policy tree 100 for a provider logical network that spans multiple sites. In some embodiments, a root node 102 represents the overall provider logical network configuration. Portions of the policy tree 100 represent logical network elements and their respective configuration, including logical forwarding elements (e.g., logical routers, logical switches, etc.). For logical network entities (e.g., logical network elements and/or policies), when the provider user account creates a new logical network entity, the network management system creates one or more nodes in the policy tree 100 for the entity. As noted, these logical network entities can include logical network elements that span one or more sites and logical network policies that apply to those elements, and the connections in the policy tree represent relationships between the nodes (e.g., parent-child relationships, logical network connections, etc.). The hierarchical policy trees of some embodiments, as well as certain types of entities represented by these policy trees, are also described in greater detail in U.S. patent application Ser. No. 16/906,925, filed Jun. 19, 2020, now published as U.S. Patent Publication 2021/0314212, and U.S. patent application Ser. No. 16/906,944, filed Jun. 19, 2020, now issued as U.S. Pat. No. 11,088,916, both of which are incorporated herein by reference.

The logical network elements represented in the policy tree include logical forwarding elements (e.g. logical routers, logical switches, etc.). For example, in FIG. 1, the policy tree 100 includes a Tier-0 (T0) logical router 105, a Tier-1 (T1) logical router 110, and a logical switch 145 (also referred to as an overlay segment). Differences between T0 and T1 logical routers will be explained further below; in short, T0 logical routers in the provider logical network provide the connection to external networks for the provider logical network (and in some cases for many tenant logical networks), whereas T1 logical routers segregate a set of logical switches from the rest of the logical network and may perform stateful services for logical network endpoints connected to those logical switches.

The node for the T0 logical router 105 has a number of child nodes, including static route definitions 130 and locale services 135 and 140 referencing different physical sites A and B. This means that the T0 logical router 105 spans these two physical sites and has centralized routing components defined within these sites, as described further below by reference to the portion of the policy tree for these sites. Grand-child nodes are defined for interfaces 120 and 125 (e.g., uplink interfaces for external connections, service interfaces for third-party services) at each of these sites as well as an IPsec VPN 115 at site B.

The node for the T1 logical router 110 has a child node for the logical switch 145. In addition, this T1 logical router node 110 references the T0 logical router node 105 (the dashed arrow), indicating that the T1 logical router 110 connects to the T0 logical router 105 in order for logical network endpoints connected to the logical switch 145 to communicate with external endpoints (i.e., endpoints of other logical networks that also connect to the T0 logical router or endpoints completely external to the virtualization infrastructure). Though not shown for the sake of simplicity, many of the entities in the policy tree 100 have various additional characteristics that define the configuration of the represented logical network entities, which may be defined by the user or inherited from a parent entity. For instance, services such as DHCP may be defined for different logical forwarding elements, logical switches are assigned IP address ranges, etc.

In addition to the logical forwarding elements, the provider hierarchical policy tree 100 include nodes for physical entities, including nodes for each physical site (e.g., each datacenter in the virtualization infrastructure). For example, in FIG. 1, there are nodes for site A 160 and site B 177 under the global root node 102. Each site has a respective enforcement point child node 161 and 178, under which specific physical resources are assigned, such as edge clusters, transport zones, etc. This figure illustrates edge clusters 151 and 152 at grand-child nodes of the site nodes 160 and 177, respectively. In some embodiments, edge clusters are groups of edge devices that host centralized routing components of logical routers (e.g., for implementing the connections with external networks, providing centralized stateful services, etc.). This figure also illustrates a transport zone node 154 in site A. Transport zones, in some embodiments, are groups of transport nodes in a particular portion of a site (e.g., a particular rack of servers). Transport nodes, in some embodiments, represent the entities of physical devices that are managed to implement the logical network. For instance, in many cases, the transport nodes are hypervisors that execute virtual switches and/or virtual routers as well as various distributed services (e.g., distributed firewalls). These managed forwarding elements and other managed network elements implement the logical forwarding elements (e.g., logical switches, distributed logical routers) as well as various logical network policies.

In the illustrated example, the edge clusters 151 and 152 have respective incoming references from locale services 135 and 140 attached to the T0 logical router 105. In some embodiments, edge clusters also have children corresponding to specific edge nodes (e.g., the edge node 153). In some embodiments, the network management system identifies the physical structure of a site (and therefore the structure of the child nodes for the site in the policy tree 100) via auto-discovery, when the site is added to the overall provider network represented by the global root node 102.

The provider network policy tree 100 also includes nodes for security-related entities. In some embodiments, security policy is at least partially organized by defining domains, which are logical groupings of one or more sites (e.g., geographic regions) that serve as an envelope to group different logical entities together (e.g., for security purposes). Domains are defined and represented as nodes in the policy tree 100 beneath the global root 102. In this case, a single domain node 170 is shown in the figure. Unlike sites (described below), which represent a physical construct, domains are a logical construct, which serve as an envelope to group different logical entities together (e.g., for security purposes). For example, firewall policies or other policy micro-segmentation applied to the domain will automatically be applied to all groups of logical endpoints defined within the domain in some embodiments.

Domains can represent a single physical site or multiple sites. In this example, the domain 170 corresponds to both of the sites A and B, and thus the domain enforcement point node 172 references both of the site enforcement point nodes 161 and 178. Some embodiments place restrictions on how sites can be organized into logical domains. For instance, each physical site may be restricted to membership in (i) a single domain containing only that site and (ii) a single domain containing more than one site. In addition, domains are only created as top-level nodes beneath the global root node 102 (i.e., domains are not children of other domains) in some embodiments. The provider user defines domains within the provider policy tree by selecting the sites that belong to the domain.

In some embodiments, logical network endpoints at each site are logically organized into security groups which can span multiple sites. These security groups are groups of logical network endpoints that share one or more attributes (e.g., operating system, region, etc.). Service machines as well as the managed network elements executing on host computers (the transport nodes) apply logical network policies (such as network policy 173) to the data messages exchanged between endpoints belonging to the security groups in some embodiments, based on policy rules that are defined in terms of these groups. In some embodiments, security groups and network policies are represented in the global policy tree 100 as child nodes of domains, and accordingly inherit their parent domain's span. In some embodiments, the span of a network policy is defined not only by its parent domain, but also by sites and/or domains which are referenced by the policy. The logical network policies in some embodiments include forwarding policies, service policies, and security policies, and are applied in some embodiments to govern the behavior of the logical forwarding elements. The policies can be child nodes of a logical network element node in some embodiments (e.g., static routing policy configuration for a logical router).

As noted, FIG. 1 conceptually illustrates the hierarchical policy tree for a provider logical network (i.e., the logical network for a top-level user of the network management and control system). These top-level users are also granted the ability to create second-level users (referred to herein as tenants) and grant these second-level users the ability to define their own security and networking configuration in some embodiments, as well as to use certain entities exposed by the provider network. Though these provider network entities may be exposed to tenant users, the tenant users are restricted from viewing or editing the configuration of the provider network (including these entities). In addition, to provide isolation between users, one tenant user is restricted from viewing (or modifying) the configuration of any other tenant users. That is, each tenant is provided with the ability to view and modify only their own configuration, and not that of any other tenants or the higher-level provider user. Within a tenant's configuration, sub-users can be created that can define their own isolated configuration (which may be linked to the tenant or provider configurations, in some embodiments). Each of these isolated configurations may be referred to as a virtual hybrid cloud (VHC); as described further below, each VHC may be isolated to a single site or spread across multiple physical sites (e.g., a combination of enterprise on-prem datacenters, branch offices, and public clouds).

Figure 2:
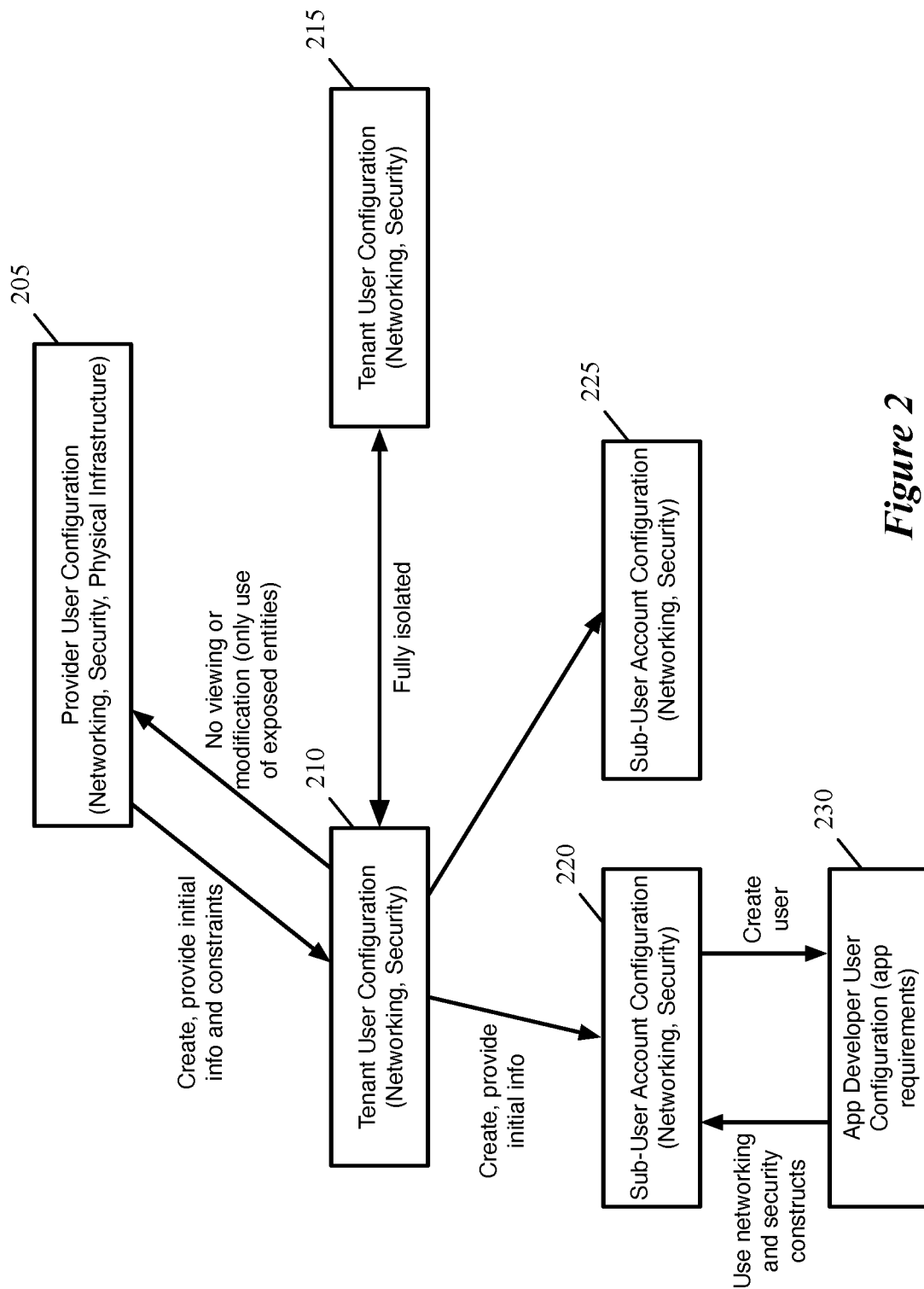
FIG. 2 conceptually illustrates the relationships between different users and their respective configurations.

FIG. 2 conceptually illustrates the relationships between different users and their respective configurations. As shown, at the top level is the configuration 205 for the provider user. In some embodiments, the network management and control system has only a single top-level provider user. This user can define logical networking and security policies as part of the configuration 205. In addition, unlike the other user configurations, the provider user configuration 205 includes physical infrastructure as part of the policy tree. As shown in FIG. 1, this physical infrastructure definition may specify different sites as well as groups of physical computing devices at each of those sites.

The provider user can also create one or more second-level (tenant) users, providing initial information and constraints for these users, and exposing certain entities from the provider logical network to the tenant user. For instance, if the provider user has multiple T0 logical routers, the provider user can associate a specific one (or more) of these T0 logical routers (or T0 virtual routing and forwarding tables (VRFs), as described below) with the tenant. The tenant can use these T0 logical routers or T0 VRFs to provide external connectivity for the tenant logical network(s). The provider also associates one or more edge clusters (of the physical infrastructure) with the tenant; this may be a manual or automatic association in different embodiments. The tenant can use these edge clusters to host T1 logical router centralized routing components, centralized services (e.g., stateful services), etc. In addition, the provider user may place certain constraints on the tenant user, such as limiting the number of certain types of elements (e.g., a maximum number of T1 logical routers) or limiting the tenant logical network to a subset of sites of the overall physical infrastructure.

The tenant user can create their own configuration 210 through the network management and control system, defining logical networking and security policies. Unlike the provider user configuration 205, the tenant user configurations 210 (or 215) do not include any physical infrastructure; otherwise these user configurations are similar in structure to the provider user configuration. As shown in the figure, the tenant user is not able to view or modify the provider user configuration 205 via the network management system. As described in more detail below, however, certain logical and/or physical entities (e.g., one or more T0 logical routers, one or more edge clusters) of the provider user configuration 205 are exposed by the provider to the tenant user configuration 210. In addition, the tenant user configurations 210 and 215 are fully isolated from each other; that is, one tenant user has no ability to view, modify, or even necessarily be aware of any other tenant user configuration, even if they share physical infrastructure resources and/or the use of provider logical network entities.

Furthermore, as shown, tenant users can create additional sub-users. As shown in FIG. 2, the first tenant user (having configuration 210) creates two sub-user accounts, which create their own configurations 220 and 225. These sub-users can also define logical networking and security within their configurations, similar to the tenant user. In some embodiments, upon creating these sub-users, the tenant user can provide associations for the tenant with (i) provider constructs that the provider user associated with the tenant and (ii) any tenant user constructs. For instance, T0 logical router and edge cluster associations may be provided to the sub-user so that the sub-user can, e.g., define T1 logical routers associated with a particular edge cluster and connect these T1 logical routers to the provider T0 logical router without any requirement to use the logical network entities of the tenant configuration 210. In addition, any restrictions placed on the tenant (e.g., restricting the number of certain types of logical network entities or the specific sites available to a tenant user) are passed to the sub-user accounts and may be further restricted by the tenant user (e.g., if a tenant user is restricted to having a maximum of five T1 logical routers, they may create five different sub-users and allow each of these sub-users only a single T1 logical router).

In some embodiments, these sub-user accounts are organized hierarchically. That is, each tenant can create one or more sub-users (referred to as organizational units in some embodiments), and these sub-users can also create further sub-user accounts. Each of the sub-user accounts at any level can create their own isolated security and networking configuration, referred to in some embodiments as a virtual hybrid cloud (VHC). In other embodiments, the tenant and organizational units are containers for lower-level accounts, and only the accounts can create separate VHCs. As an example organization, the provider user might be an IT team for an enterprise, with the sites over which the virtualization infrastructure is implemented being a set of main and branch offices of the enterprise. In this case, a tenant user might be the network admin(s) for a line of business within the enterprise, and sub-users are defined for different organizational units within that business line, etc. Similarly, if the provider user is a public cloud provider with multiple datacenters and a tenant is a public cloud tenant (e.g., an enterprise), then the sub-users might be different business lines within the scope of the tenant.

In addition, some embodiments allow the tenants or sub-users to create application developer users. These users, as described in greater detail below, are not able to view or modify any logical networking configuration (neither the configuration of the user that created the application developer user nor of any higher-level users) but can define requirements for applications to be deployed in a particular VHC. As shown in FIG. 2, the app developer user is created by one of the sub-users, and provides application requirements 230, which use the networking and security constructs (e.g., the VHC) of the sub-user account configuration 220. The application developer user concept allows networking administrators to enable application developers to create applications within the virtualization infrastructure without having to either (i) provide access to the actual networking configuration for the application developer or (ii) manually create networking and security constructs tailored to each application deployed in the virtualization infrastructure.

Figure 3:
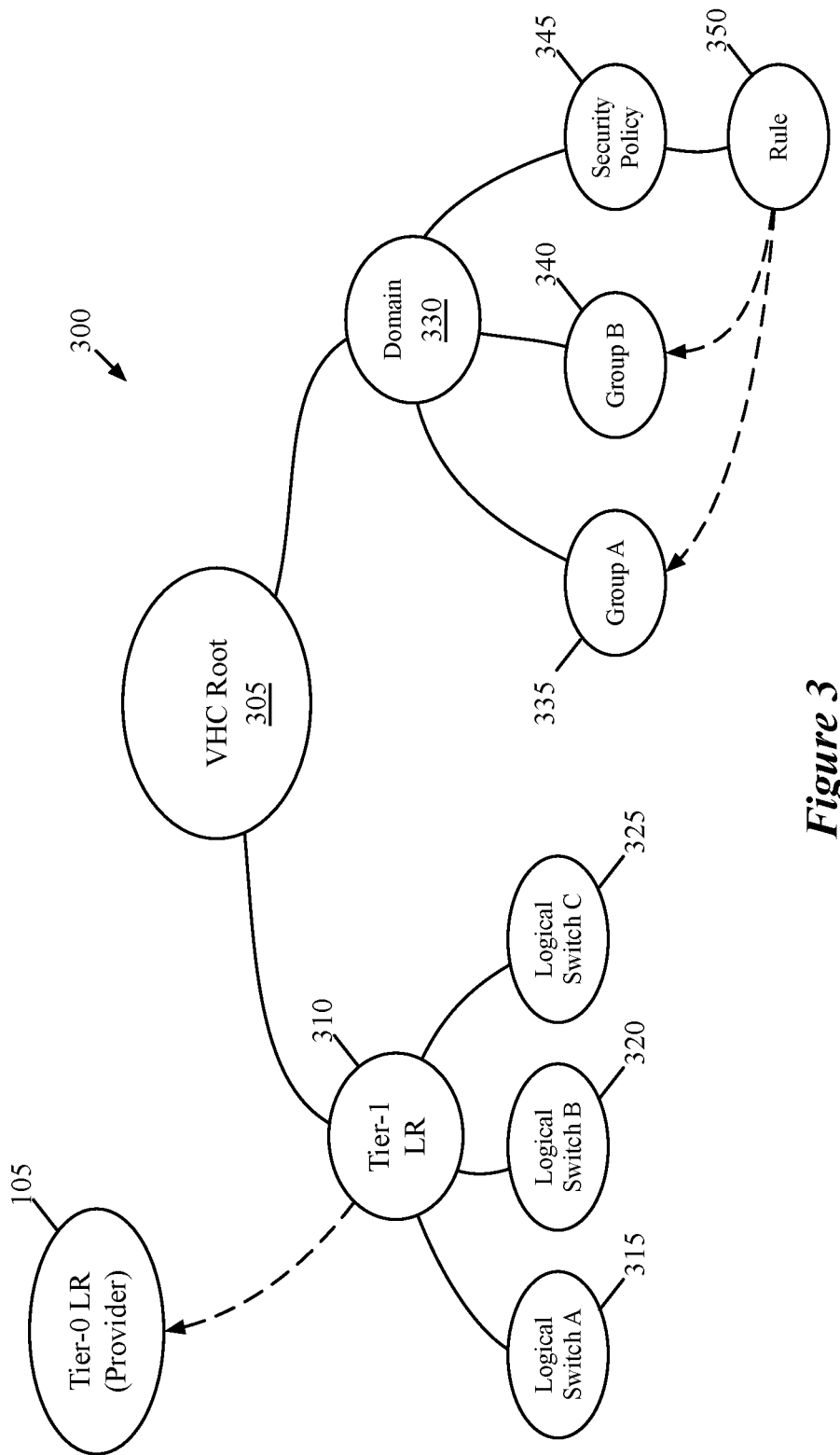
FIG. 3 conceptually illustrates a simple example of a hierarchical policy tree for a sub-user logical network.

In some embodiments, the data model for the tenant configuration (or for other sub-user configurations) is similar to that for the provider configuration. That is, the tenant configuration is also represented (e.g., in storage of the network management system) as a hierarchical policy tree with similar nodes and connections. FIG. 3 conceptually illustrates a simple example of a hierarchical policy tree 300 for a sub-user (e.g., a tenant user, a sub-user account) logical network (within a VHC). As with the provider policy tree 100, a root node 305 represents the overall VHC created by the user. This policy tree 300 includes a logical networking section as well as a security section. However, unlike the provider policy tree 100, the sub-user policy tree 300 does not include physical infrastructure nodes defining sites and groups of physical computing devices within a site (i.e., there are no edge cluster or transport zone nodes in the sub-user policy tree). Some embodiments prevent the tenant users or sub-users from both viewing or configuring the provider physical infrastructure nodes and from defining their own physical infrastructure policy.

On the logical networking side, the policy tree 300 includes a T1 logical router node 310 with three connected logical switch nodes 315-325. This T1 logical router node 310 is also shown as connecting to a T0 logical router node 105 that is part of the provider configuration. This T0 logical router 105 may be exposed to the tenant user (and thus its sub-users), enabling the user creating the VHC to connect to the T0 logical router 105 without viewing or modifying its full configuration. If the T1 logical router represented by node 310 has centralized components (e.g., for providing stateful services) rather than only having a distributed component, then the node 310 in some embodiments would also be associated with edge clusters in one or more sites (e.g., via locale service sub-nodes, as is the case for the T0 logical router 105 shown in FIG. 1).

The policy tree 300 also includes security-related nodes, with a domain node 330 defining a domain. For simplicity, the links to one or more site enforcement points (in the provider policy tree) are not shown in this figure, but some embodiments do allow tenants and other sub-users to define domains across one or more sites (though the sites for a domain are limited by the sites to which the VHC is restricted).

All types of users may define security policy for their respective VHCs in some embodiments. This security policy may include, in some embodiments, security rules (e.g., distributed firewall rules and/or gateway firewall rules), security group definitions, etc.

For simplicity, the links to one or more site enforcement points (in the provider policy tree) are not shown in this figure, but some embodiments do allow tenants and other sub-users to define domains across one or more sites (though the sites for a domain are limited by the sites to which the VHC is restricted). Within this domain 330, the user has defined two security groups 335 and 340, as well as a security policy 345 that includes a rule 350 referencing the two security groups 335 and 340 (e.g., a rule allowing or denying traffic between Group A and Group B).

Figure 4:
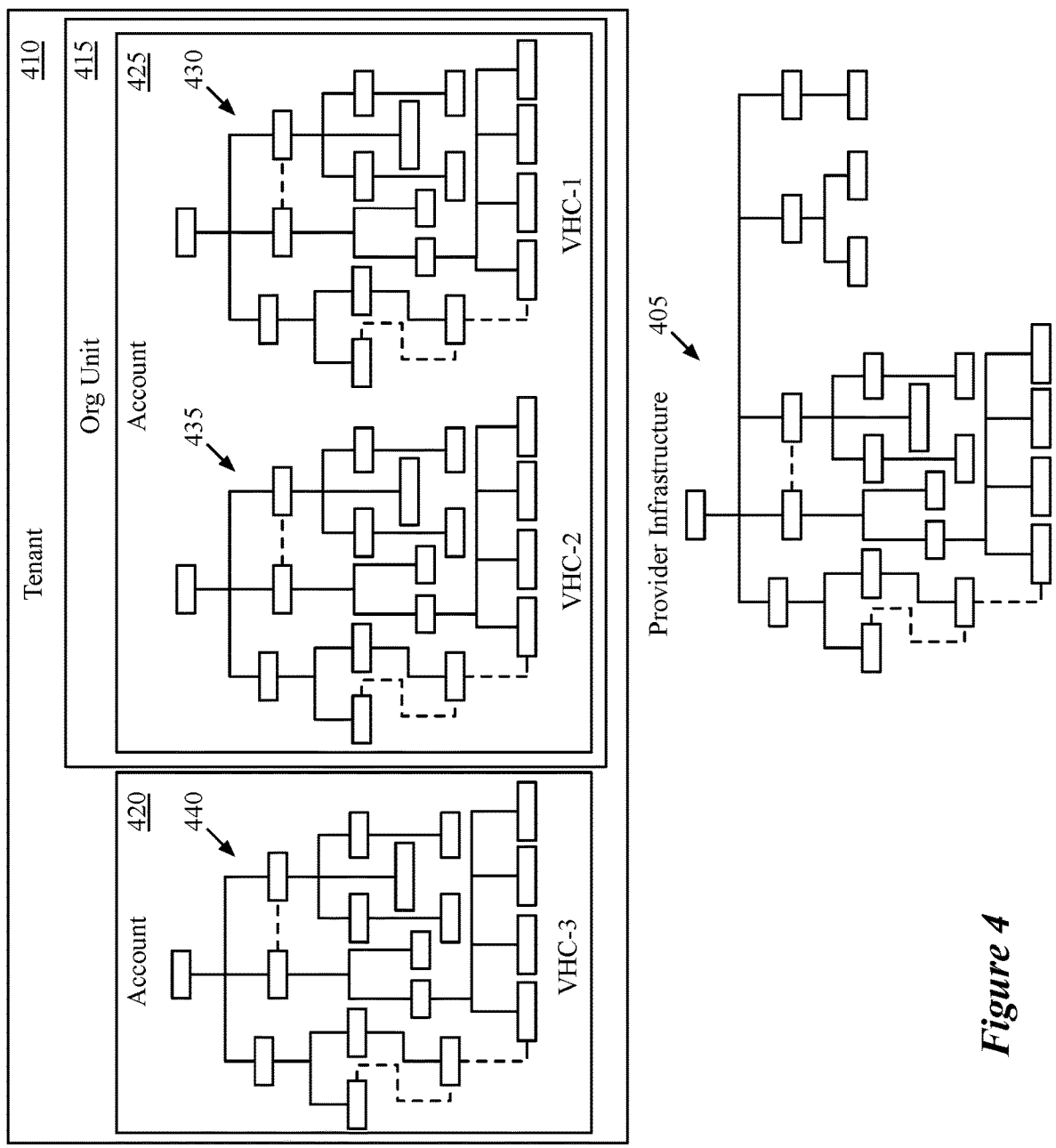
FIG. 4 conceptually illustrates an example set of nested users of a network management system and their different VHCs.
Figure 5:
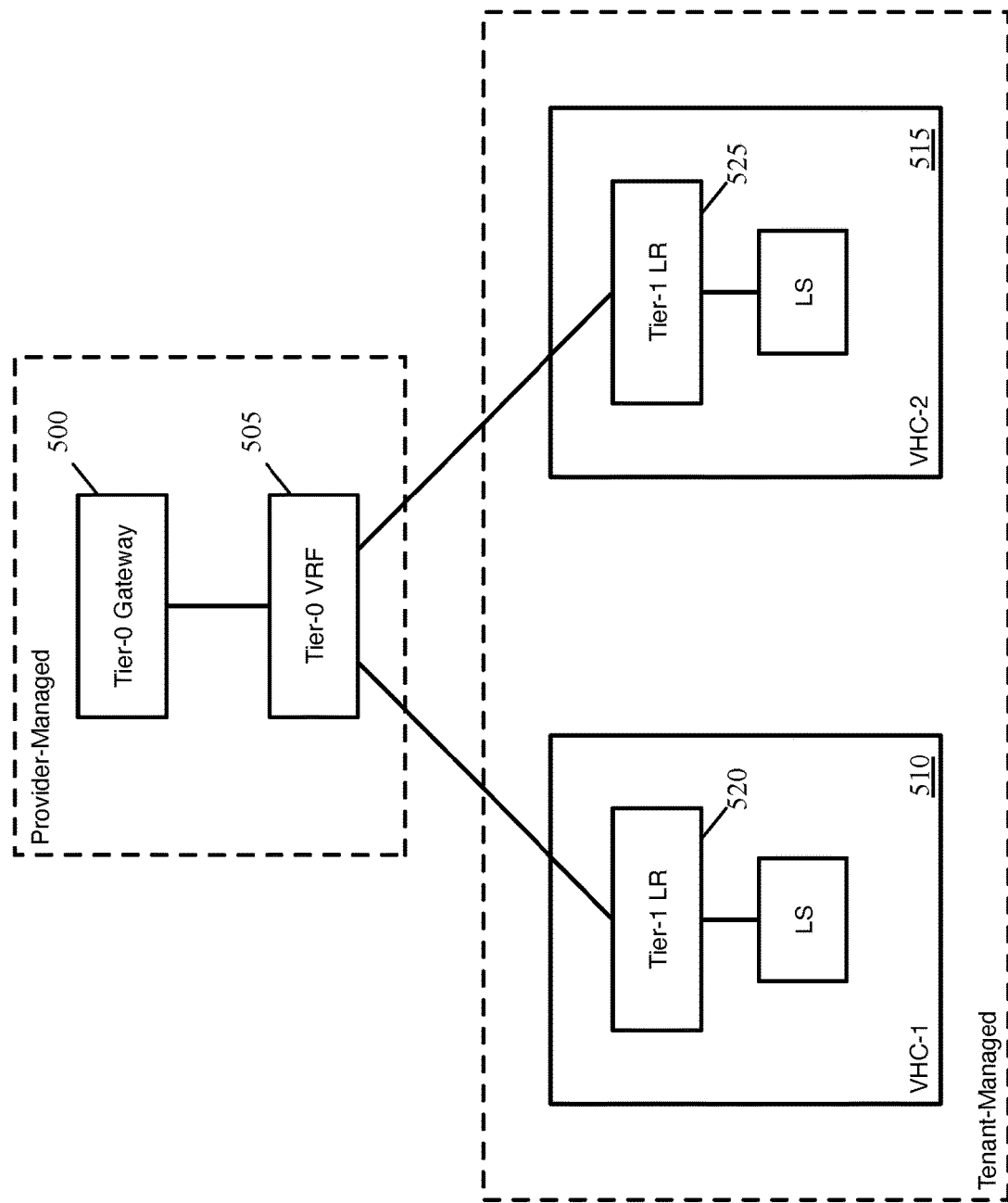
FIGS. 5-9 conceptually illustrate different methods for connecting tenant logical networking constructs in different VHCs to external networks via a T0 logical router and its VRFs.

Each VHC in a virtualization infrastructure (i.e., a set of datacenters) managed by a network management system has a similar data model. FIG. 4 conceptually illustrates an example set of nested users of a network management system and their different VHCs. Though all of the VHCs are shown with the exact same structure, it should be understood that this is an illustrative example and different VHCs in a virtualization infrastructure will typically have varying definitions even though the data models are the same for all of the VHCs. Furthermore, the provider infrastructure policy tree 405 is shown separately from the tenant VHCs and includes additional nodes representative of the physical infrastructure nodes in the policy tree 405.

The provider creates a tenant user 410 as described, and directly within the domain of this tenant user 410, one organizational unit 415 is created and one account 420 is created. In addition, within the organization unit 415, that user creates an account 425. In some embodiments, any type of user may define a VHC, while in other embodiments only "account" users may define a VHC (as is the case in this example). In this case, the account user 425 defines two separate isolated VHCs 430 and 435, while the account 420 defines a single VHC 440 that is isolated from the first two VHCs 430 and 435 (but shares the same data model with both them and the provider policy tree 405). That is, a single account may define multiple VHCs (e.g., to deploy different applications).

The isolation between VHCs requires that entities in one VHC may not be associated with entities in other VHCs, in some embodiments. That is, there should be no connections between the policy tree nodes for one VHC and those of another VHC (except that they may both be associated with the same exposed entity from the provider logical network. While the VHCs are isolated, some embodiments allow some communication between endpoint DCNs in different VHCs (e.g., so that a DCN implementing an application in one VHC can access backup servers in a different VHC of the same tenant or sub-user). In some embodiments, when a user creates a VHC, before (or in addition to) defining the logical network, the user defines capabilities of the VHC (e.g., services offered within the VHC) as well as the capacity of the VHC (e.g., the sites to which the VHC is restricted, as well as various requirements related to the size, scale, latency, throughput, etc.). In accordance with having a similar data model for the respective configurations, the API is also similar for the provider user and for the various sub-users when defining (e.g., creating, modifying) the same type of entity.

As mentioned above, some embodiments only allow the provider user to create and configure T0 logical routers, and particular T0 logical routers or T0 VRFs can be associated with different tenants and their VHCs. This allows the provider user (e.g., the enterprise IT team, a cloud provider network admin) to oversee all of the rules regarding external connections to the virtualization infrastructure (e.g., routing protocols for route exchange with external routers, virtual private network (VPN) connections, etc.). The provider user can define multiple virtual routing and forwarding tables (VRFs) for a single T0 router in some embodiments. The tenant user, on the other hand, can only define T1 logical routers in some embodiments.

The types of logical routers in some embodiments will be quickly described in greater detail. In some embodiments, logical routers can be either T0 logical routers that provide a connection to external networks or T1 logical routers that (i) connect logical switches to each other, (ii) provide services (e.g., firewall, load balancing, etc.), and (iii) enable connections to T0 logical routers. T0 logical routers are generally defined by the network management and control system to have a distributed routing component (DR) that is implemented in a distributed manner and one or more centralized routing components (service routers, or SRs) that are implemented in a centralized manner by edge devices. T1 logical routers may be entirely distributed (e.g., if no centralized stateful services are defined for the T1 logical router) or may similarly have both a DR as well as one or more SRs. The details of these types of logical routers and logical routing components are further described in U.S. patent application Ser. No. 16/906,905, filed Jun. 19, 2020, now published as U.S. Patent Publication 2021/0314257, which is incorporated herein by reference.

The provider can expose external connectivity via a T0 logical router to the tenant VHCs in a variety of different ways in some embodiments. As noted above, some embodiments allow for one or more VRFs (i.e., independent routing tables to which packets may be assigned) to be defined for a particular T0 logical router and for these VRFs to be exposed to the tenant users (or the T0 VRFs can be managed by the tenant user), rather than exposing the T0 logical router itself. In some embodiments, the SR for a T0 logical router is configured to implement all of the VRFs for that T0 logical router, whether those VRFs are managed by the provider user or the tenant user. When a particular T1 logical router is connected to a particular T0 VRF, outgoing packets processed by the particular T1 logical router are sent to the T0 logical router in some embodiments with indicators (e.g., within an encapsulation header) that the packets are from the particular T1 logical router (e.g., based on a logical switch defined internally to connect the two logical routers). Based on this indicator, the T0 SR applies the correct VRF to the packets.

FIGS. 5-9 conceptually illustrate different methods for connecting tenant logical networking constructs in different VHCs to external networks via a T0 logical router and its VRFs. For example, in FIG. 5, two different VHCs managed by the same tenant (possibly belonging to different accounts) share the same T0 VRF. In this example, the provider defines both a T0 gateway logical router 500 and a VRF 505 for this logical router, and exposes the VRF 505 to the tenant user. This tenant user manages two VHCs 510 and 515, inside of which respective T1 logical routers 520 and 525 are defined. In this example, both of the T1 logical routers 520 and 525 (in different VHCs) connect to the T0 VRF 505.

Figure 6:
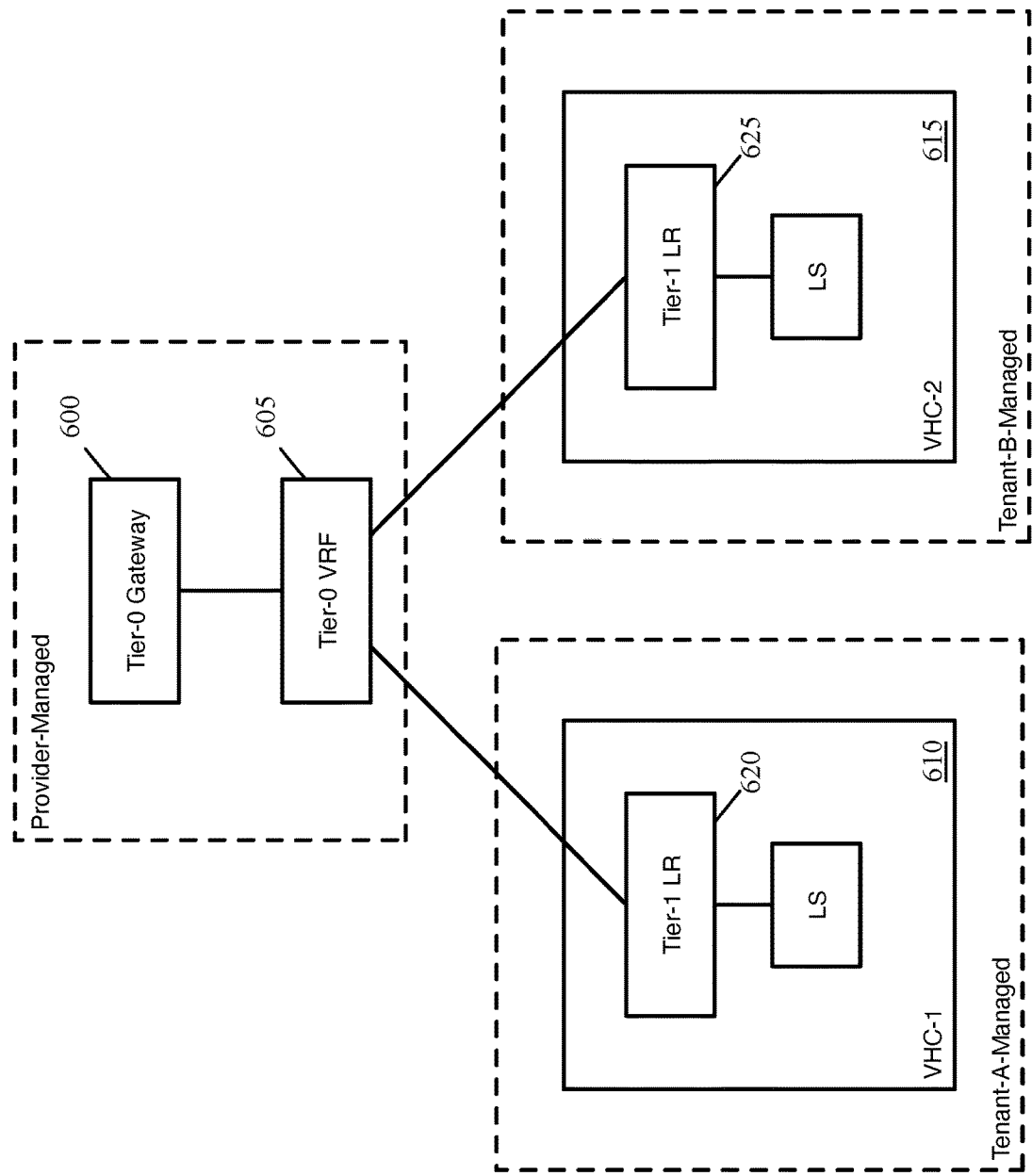

FIG. 6 conceptually illustrates that two different VHCs managed by different tenants may also connect to the same VRF in some embodiments, if exposed by the provider to both tenants. In this example, the provider again defines both a T0 gateway logical router 600 and a VRF 605 for this logical router, and exposes the VRF 605 to tenant users A and B. Each of these tenant users manage their respective VHCs 610 and 615, inside of which respective T1 logical routers 620 and 625 are defined. In this example, both of the T1 logical routers 620 and 625 (in different VHCs managed by different tenants) connect to the T0 VRF 605. It should be noted that if two or more different tenants use the same T0 VRF exposed by the provider, the provider should ensure that there is no overlap in the IP addresses assigned to the different tenants, as any overlap could create confusion for the T0 VRF when handling incoming data traffic.

Figure 7:
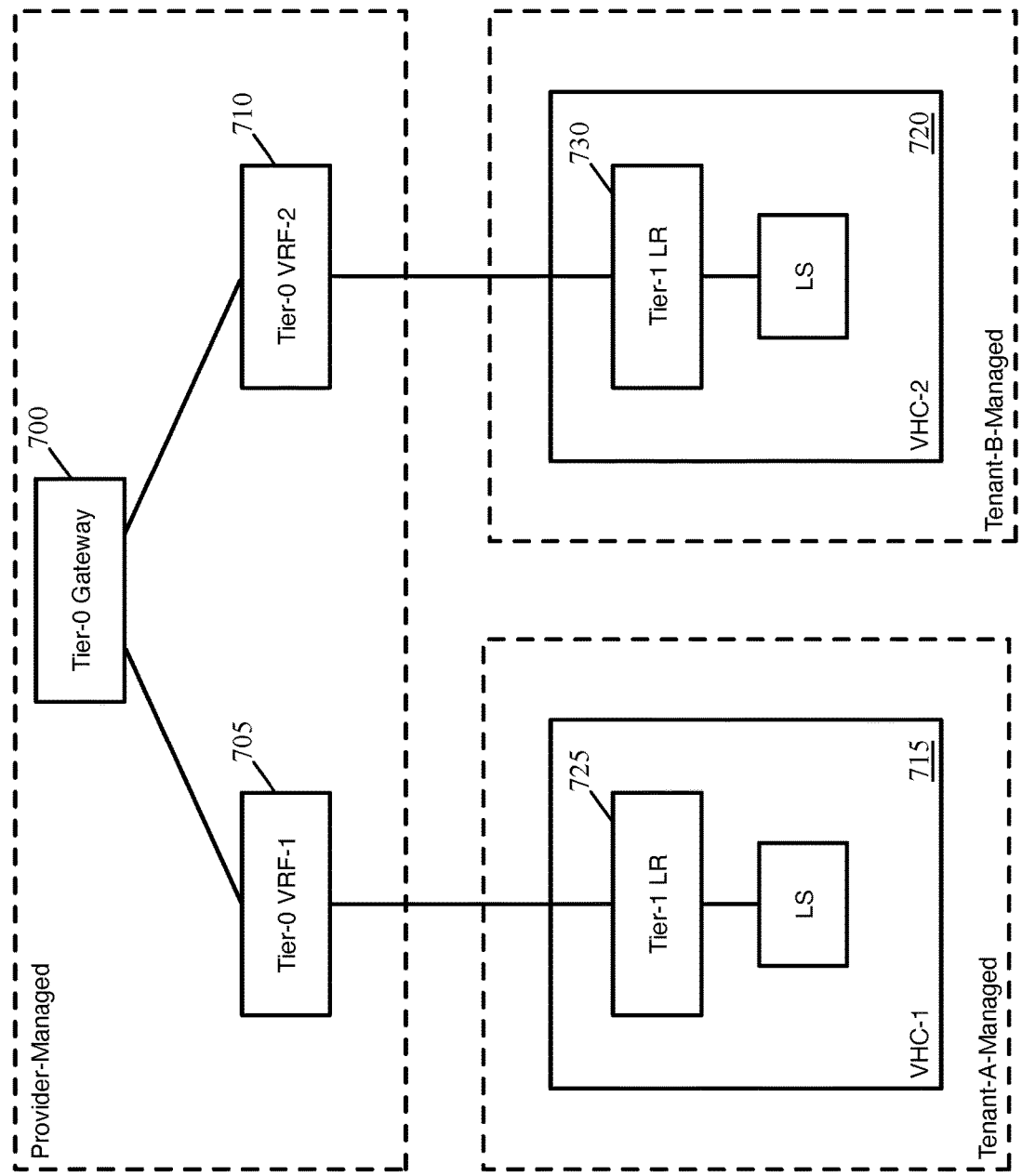

FIG. 7 conceptually illustrates that the provider may expose different VRFs of the same T0 logical router to different tenants, so that the VHCs managed by these tenants connect to the different VRFs. In this example, the provider defines a T0 gateway logical router 700 and two VRFs 705 and 710 for this logical router. The first VRF 705 is exposed to tenant user A and the second VRF 710 is exposed to tenant user B. Each of these tenant users manage their respective VHCs 715 and 720, inside of which respective T1 logical routers 725 and 730 are defined. These T1 logical routers 725 and 730 connect to the respective T0 VRFs 705 and 710 that are exposed by the provider user to their respective tenants.

Figure 8:
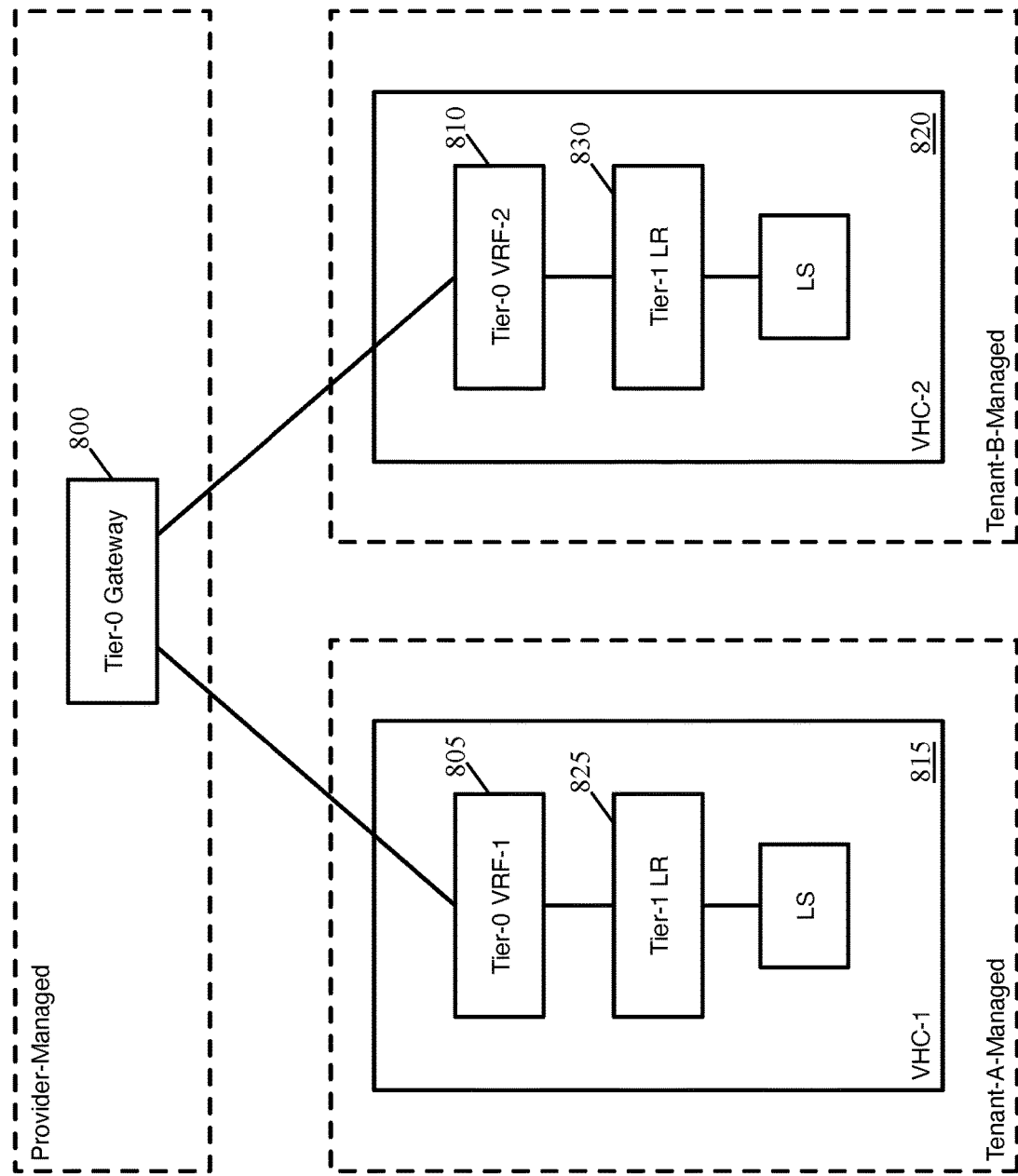

FIG. 8 conceptually illustrates that one or more tenants can manage the VRFs associated with a T0 logical router within their own VHCs (or within a different VHC managed by the tenant, depending on the configuration). In this example, the provider defines a T0 gateway logical router 800 and exposes this logical router 800 to the tenant users A and B. Each of these tenant users manages their respective VHCs 815 and 820, inside of which respective T1 logical routers 825 and 830 are defined. In addition, each of the tenant users manages a respective T0 VRF 805 and 810. These VRFs may be automatically defined when the tenant users are created, or separately created and linked with the T0 logical router 800 in different embodiments. While the previous examples illustrate cases in which the provider entirely manages the T0 logical router and T0 VRFs, in this example a T0 VRF is created specific to that tenant which can be managed by the tenant. It should be noted that while this example shows the T0 VRFs 805 and 810 in a VHC along with the T1 logical routers 825 and 830 as well as logical switches, in some embodiments the tenant-managed T0 VRFs are automatically created for the tenants in an isolated VHC (i.e., separate from any other VHCs of the tenant). The tenant user can manage this T0 VRF and define services such as routing protocols (e.g., BGP, OSPF) and VPNs. If the T0 VRF is configured in a separate VHC, this configuration is then isolated from any sub-users, though the tenant user can also expose the T0 VRF to its sub-users for connecting to the T1 logical routers of their VHCs.

Figure 9:
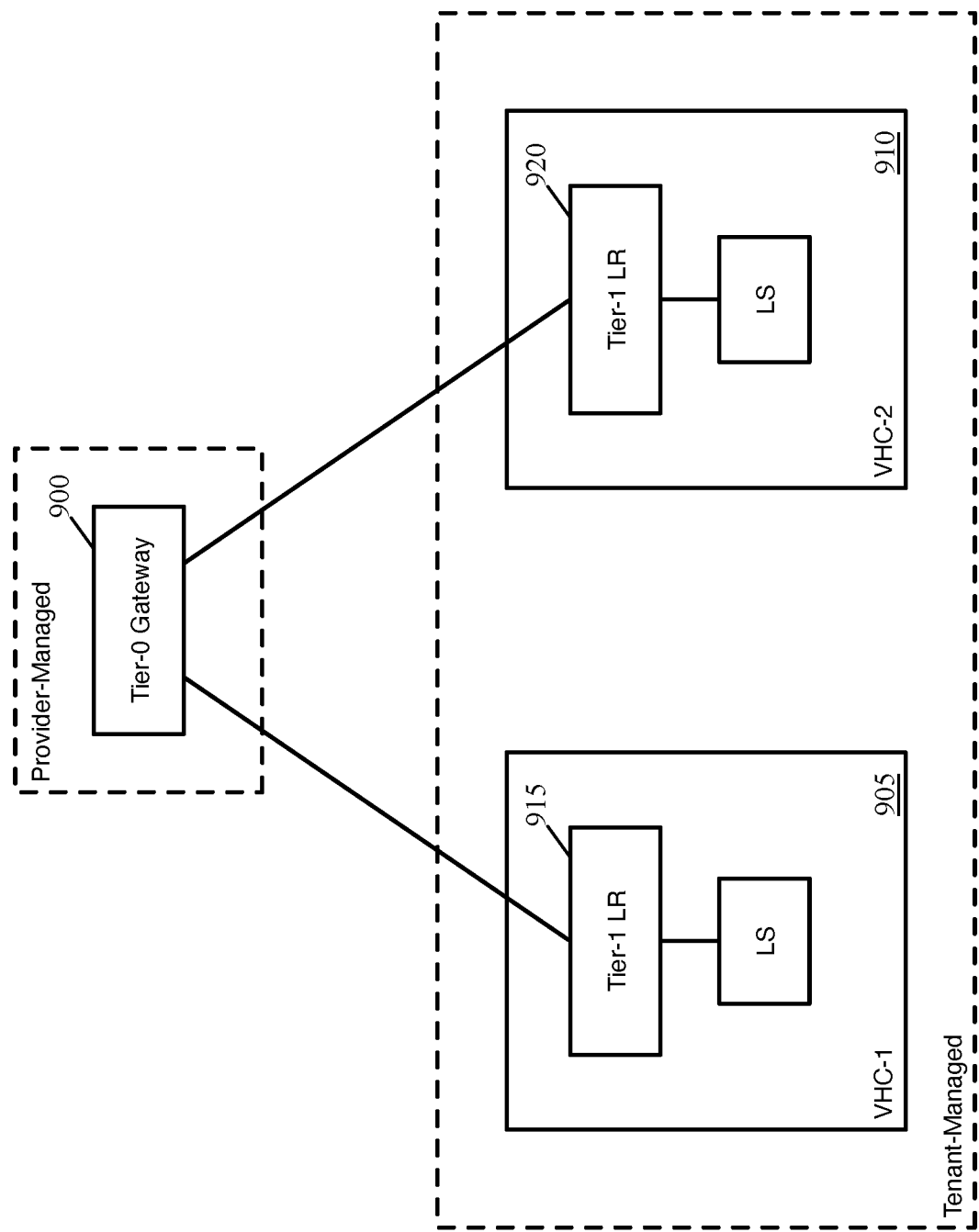

Finally, FIG. 9 conceptually illustrates that the provider may simply expose the T0 logical router itself to a tenant (or multiple tenants), without the use of VRFs at all (though in some such cases, the actual edge devices implementing the SRs for the T0 logical router may use one or more VRFs to handle routing). In this case, the provider defines a T0 gateway logical router 900 and exposes this logical router to a tenant user. This tenant user manages two VHCs 905 and 910, inside of which respective T1 logical routers 915 and 920 are defined. In this example, both of the T1 logical routers 915 and 920 (in different VHCs) connect directly to the exposed T0 logical router 900.

While the tenant users cannot configure or view the configuration of entities defined within the provider logical network, as indicated, some embodiments allow the provider user to expose some of these entities for use by the tenant users. In some embodiments, the provider user exposes these entities to one or more tenants via labels, which allow the tenant user to identify the type of entity and any specific properties of import, but not to view or modify the full configuration of the entity.

Figure 10:
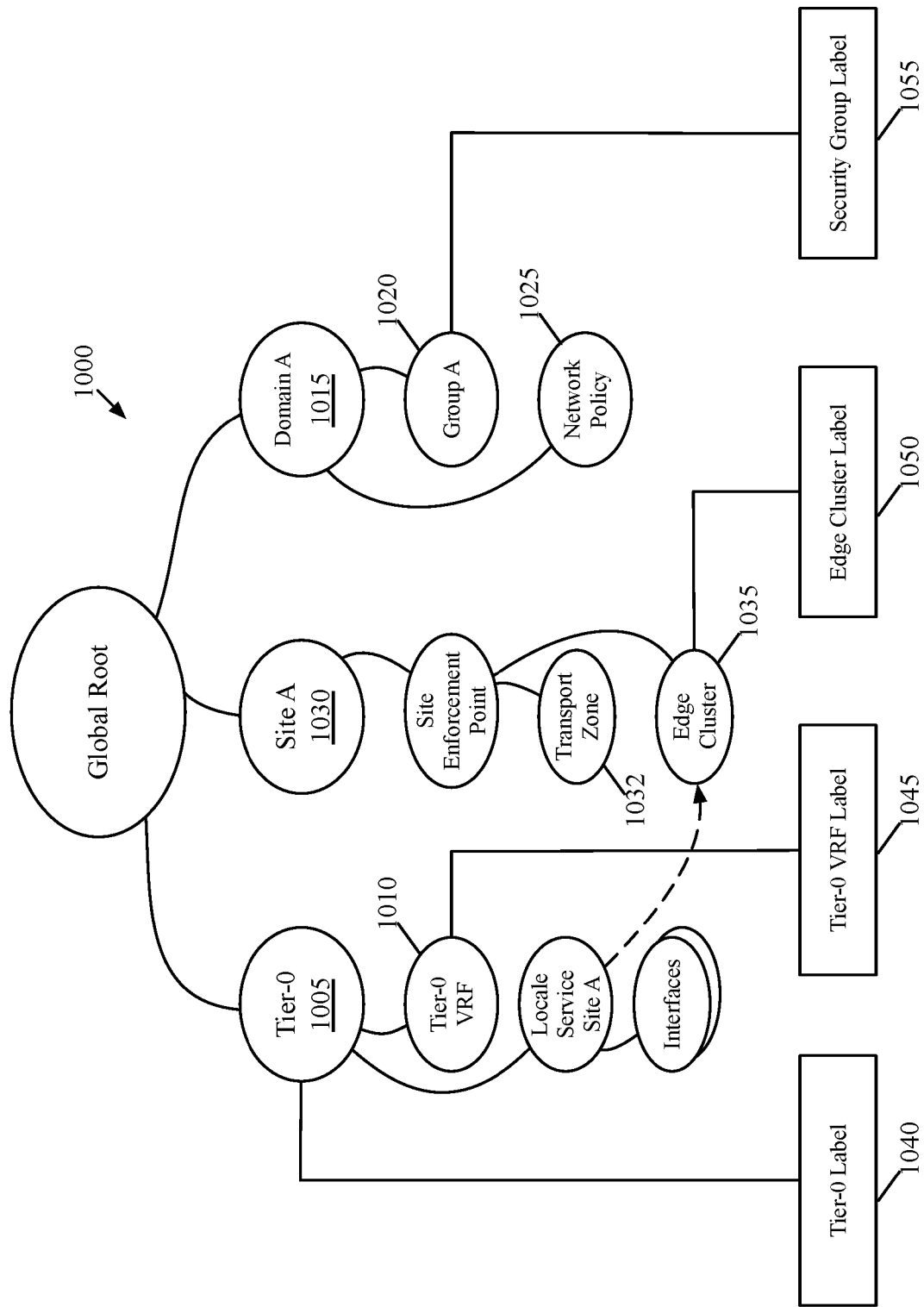
FIG. 10 conceptually illustrates a provider policy tree with certain entities exposed to tenants via labels.

FIG. 10 conceptually illustrates a provider policy tree 1000 with certain entities exposed to tenants via labels. Similar to the policy tree shown in FIG. 1, the provider policy tree 1000 includes a T0 logical router node 1005 with one T0 VRF node 1010 defined (in addition to other child and grand-child nodes). The policy tree 1000 also includes a node 1015 representing a domain, which includes a security group 1020 and a defined network policy 1025. Finally, the physical infrastructure portion of the policy tree 1000 includes a site node 1030 with grand-child nodes (underneath the site enforcement point) for a transport zone 1032 and an edge cluster 1035.

The figure also illustrates that a number of these entities are exposed to tenants via labels. Specifically, the T0 logical router 1005 is exposed via a label 1040, the T0 VRF 1010 is exposed via a label 1045, the edge cluster 1035 is exposed via a label 1050, and the security group 1020 is exposed via a label 1055. The use of labels allows the provider to expose the entities without exposing the configuration of the entity (i.e., the tenant cannot view the configuration of the exposed entity at all). The T0 logical router label 1040 or T0 VRF label 1045 enables a tenant user to which these labels are exposed (or their sub-users) to connect their T1 logical routers to these entities without viewing the logical router configuration. Such labels might indicate the sites spanned by the T0 logical router, but not the VLAN segments connected to the T0 logical router or its routing protocol configuration. The edge cluster label 1050 might indicate the site at which the edge cluster is located, but not any details about the edge cluster that are available to the provider (e.g., the type or number of edge devices in the cluster). Finally, the security group label 1055 might indicate the attributes that cause a DCN to belong to the security group, but not the full membership of the group outside of the tenant VHC. It should be noted that other types of entities may be exposed via labels in some embodiments (e.g., services such as load balancers).

Figure 11:
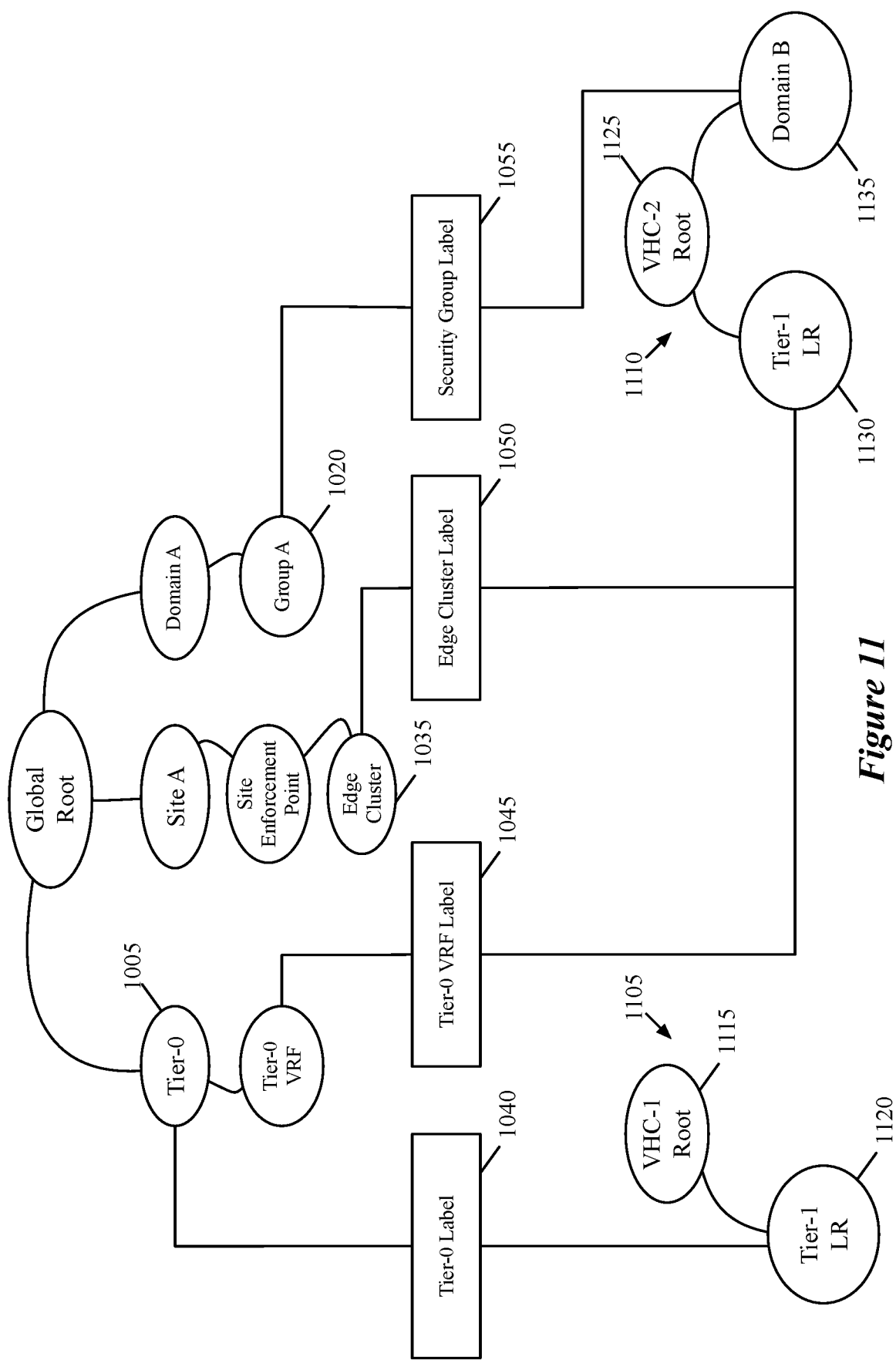
FIG. 11 conceptually illustrates the consumption of the labels shown in FIG. 10 by two different tenant VHCs.

FIG. 11 conceptually illustrates the consumption of these labels 1040-1055 by two different tenant VHCs. For simplicity, only relevant nodes of the policy trees 1105 and 1110 for these VHCs are shown in the figure. The first VHC represented by root node 1115 includes a T1 logical router represented by node 1120. This T1 logical router 1120 is purely distributed (i.e., there are no services requiring centralized routing components for the T1 logical router 1120) and thus no edge cluster is required. However, the T1 logical router 1120 is connected to the T0 logical router 1005 in the provider network via the label 1040. The second VHC represented by root node 1125 includes a T1 logical router represented by node 1130 and a domain represented by 1135. Here, the T1 logical router 1130 requires centralized routing components and is therefore linked to the edge cluster 1035 via the label 1050. In addition, the T1 logical router 1130 is connected to the T0 VRF 1010 via the label 1045. The T1 logical router 1120 in the first VHC connects directly to the T0 logical router 1005, while the T1 logical router 1130 in the second VHC connects to the T0 VRF 1010 because in this case the provider exposes the T0 label 1040 to the tenant managing the first VHC and exposes the T0 VRF label 1045 to the tenant managing the second VHC. Lastly, the domain 1135 in the second VHC 1110 represented consumes the security group 1020 via the label 1055, so that this security group 1055 is part of the domain 1135 defined within the second VHC.

In addition to the types of users described above, in some embodiments tenant users or sub-users may define user accounts for application developers. In some embodiments, these application developer users are associated with a VHC, but may not view or configure the logical networking and security rules of this VHC (i.e., these users are not granted the ability to create a new VHC or view the configuration of the VHC with which they are associated). Rather these users can define applications within the scope of the associated VHC, and various policies defined for the VHC enable the automated implementation of these applications without additional intervention by the user that owns the VHC.

Figure 12:
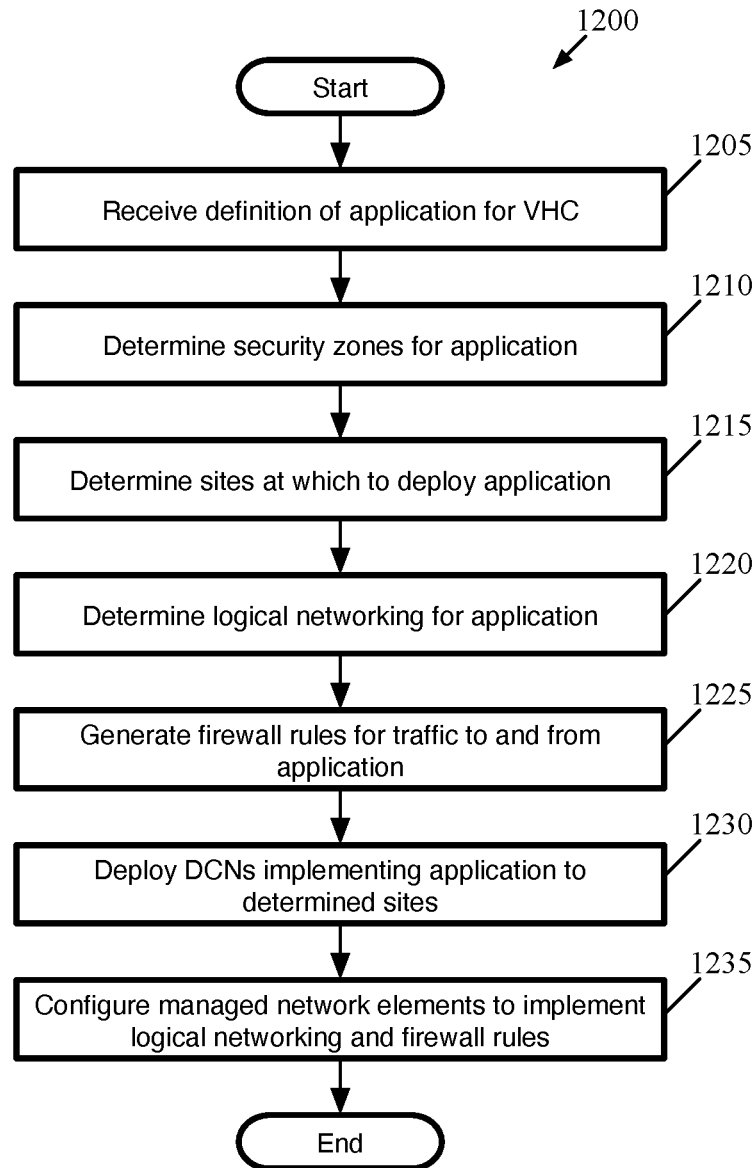
FIG. 12 conceptually illustrates a process of some embodiments for deploying an application based on an application definition from an application developer user.

FIG. 12 conceptually illustrates a process 1200 of some embodiments for deploying an application based on an application definition from an application developer user. In some embodiments, the process 1200 is performed by the network management and control system upon receiving an application definition for a particular VHC. The various different operations of the process 1200 will also be described in greater detail below. It should be understood that the process 1200 is a conceptual process, and that the operations shown in this process may be performed in a different order or in parallel.

As shown, the process 1200 begins by receiving (at 1205) a definition of an application to be deployed in a particular VHC. The application definition, in some embodiments, specifies requirements for deployment of a real-world application. These applications may include widely used applications such as SharePoint, Epic, or SAP, as well as single- or multi-tier proprietary applications specific to a business's needs. The requirements specified by the application definition may include, e.g., connectivity requirements (e.g., whether external connectivity is required), service requirements (e.g., load balancers, etc.), and the set of available sites in which the application may be deployed (e.g., if the application does not comply with Europe's general data protection regulation (GDPR), it may only be deployed in North American sites), among other requirements. In some embodiments, as described further below, the application is defined in terms of a set of tiers (e.g., web tier, app tier, database tier), and the connectivity and other requirements for each tier.

The process 1200 then determines (at 1210) security zones into which the application is deployed. In some embodiments, the tenant users and their sub-users (i.e., the owner of a VHC) can define security zones within the VHC. In some embodiments, security zones are defined to govern the connectivity (or other security policies) of applications. That is, DCNs implementing an application or application tier are assigned to security zones, and the connectivity and/or other security policies of the security zone are applied to those DCNs. Examples of common security zones include a first zone that allows connections from external endpoints (often referred to as a DMZ) as well as a second zone that does not allow connections from external endpoints but does allow incoming connections from the first zone (often referred to as a production zone, and with which back-end servers or application tiers may be associated). Some embodiments may also include a testing security zone for applications in their testing phase (with minimal or no external traffic required at this point).

Next, the process 1200 determines (at 1215) the sites at which to deploy the application. In some embodiments, the user that defines a security zone also defines the span of that security zone in terms of sites (of the provider's physical infrastructure), thereby restricting applications (or tiers of applications) assigned to the security zone to those sites. The sites to which a security zone is restricted can include any of the sites to which the containing VHC is restricted, in some embodiments, but cannot include other sites that are not available for the VHC. An application can be deployed in any of the sites that are (i) specified for the application and (ii) available for the security zone(s) to which the application is assigned. In some embodiments, this determination is made on a tier-by-tier basis.

The process 1200 also determines (at 1220) the logical networking setup for the application. Some embodiments automatically generate logical networking constructs based on the application definition. Specifically, some embodiments allow the user that defines a VHC to define application association policies for the VHC. An application association policy, in some embodiments, specifies how an application is translated into logical network entities. For an application defined with multiple tiers (which may also be referred to as application subnets, in some cases), an application association policy might automatically define a separate logical switch for each application tier, along with a T1 logical router that connects these new logical switches. Rather than defining a separate logical switch for each tier, an application association policy could also assign all of the tiers (i.e., all of the DCNs implementing the tiers) to the same logical switch. In this case, some embodiments differentiate the tiers using compute expressions (e.g., assigning tags or other metadata to the DCNs implementing the different tiers).

The process 1200 also generates (at 1225) firewall rules for traffic to and from the application. In some embodiments, these firewall rules implement the security zones to which the application is assigned for the traffic to and from the application. For instance, for connections internal to the virtualization infrastructure (e.g., for connections between DCNs assigned to the DMZ and DCNs assigned to the production zone), some embodiments automatically populate distributed firewall rules to allow these specific connections.

In addition, if the application has connectivity to external networks, some embodiments auto-populate gateway (edge) firewall rules to ensure that these connections are allowed. In some embodiments, these gateway firewall rules are arranged in sections. The firewall rules have relative priorities within a section, and the sections have different priorities as well, so that the highest priority rule in the highest priority section is the highest priority rule overall. For applications that require incoming connections, the firewall rules are configured to allow connections in for that application, but not such that all incoming traffic is allowed at the gateway. Thus, some embodiments have a default rule denying incoming connections, but include a higher priority rule that specifies to skip (jump) to a different firewall rule section specific to the application if the incoming connection is directed to the application. The application-specific firewall rule section has rules configured specifically for the application, typically along with another default rule denying connections that do not meet the specific required characteristics for the application.

Next, the process 1200 deploys (at 1230) DCNs implementing the application at the determined sites. In some embodiments, this operation is actually performed by a compute manager that is separate but works in conjunction with the network management system. The DCNs may be VMs, containers, or other types of DCNs in different embodiments, and are deployed with software required to implement the application (or a specific tier of the application). The deployment, in some embodiments, also enables these DCNs to attach to the appropriate logical ports of the logical switches (or other logical forwarding elements) to which the DCNs are connected according to the determined logical networking constructs for the application.

Finally, the process 1200 configures (at 1235) managed network elements to implement the logical networking and firewall rules (and any other security or other services required for the application). These managed network elements, as described above, include various elements executing in the hypervisors of the nodes to perform logical switching, logical routing, implementation of distributed firewall rules, etc. The managed network elements also include the edge devices that implement the T0 and T1 SRs and implement gateway firewall rules in some embodiments. The process 1200 then ends.

As noted, tenant users and their sub-users are able to define security zones through the network management system in some embodiments. These security zones govern the connectivity or other security policies of applications, such that the connectivity and/or other security policies of a security zone are applied to the DCNs assigned to that security zone.

Figure 13:
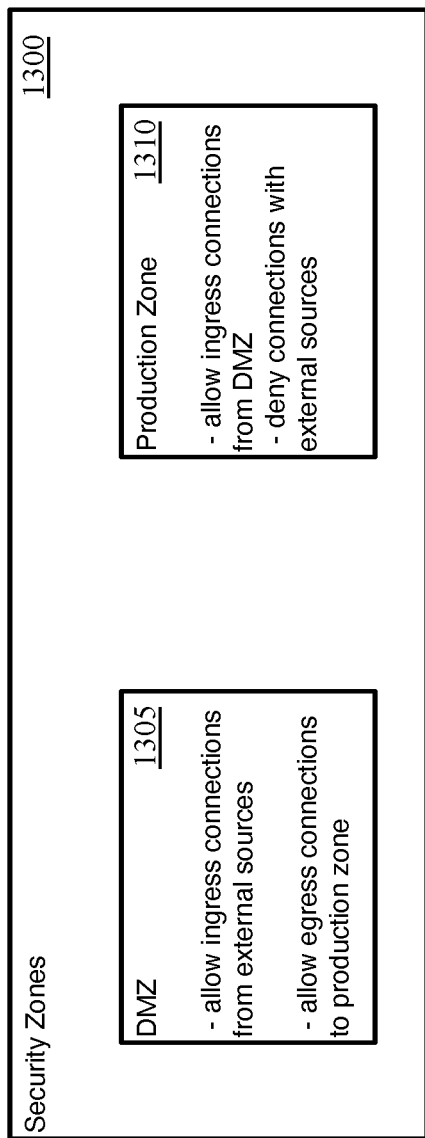
FIG. 13 conceptually illustrates definitions for two security zones for a VHC according to some embodiments.

FIG. 13 conceptually illustrates definitions for two security zones 1300 for a VHC according to some embodiments. These two security zone definitions include a DMZ definition 1305 and a production zone definition 1310. As shown, the DMZ definition 1305 specifies that applications (or application tiers) assigned to the DMZ are allowed to receive ingress connections from external sources (e.g., from web clients). This connectivity is important for applications that allow users to interact with the application via the Internet (e.g., without a VPN connection). In addition, the DMZ definition 1305 specifies that egress connections are allowed to DCNs assigned to the production zone. Similarly, the production zone definition 1310 specifies that ingress connections are allowed from the DMZ, but that any connections with external sources are denied. Though only two security zones are specified in this example, it should be understood that other types of security zones may be specified in some embodiments; for instance, a test security zone might not allow connections from outside the test zone (i.e., for use by applications during a testing phase).

It should be noted that, in this example, the security zones are defined at the same level for a particular VHC. In some embodiments, the network management system allows a user (e.g., a tenant user or sub-user, or even a provider user) to define security zones that are available across all VHCs underneath that particular user. That is, a provider user could define the DMZ security zone for all VHCs in the entire virtualization infrastructure. Similarly, a tenant could define a DMZ security zone (if the provider does not) for all VHCs belonging to the tenant and its sub-users.

While the security zones applicable to a VHC are defined by the VHC owner or higher-level users, the applications are defined by an application developer user. These applications are defined as sets of application tiers in some embodiments, with requirements specified for each tier. For instance, applications are commonly specified as 3-tier applications, with a web tier of web servers that accept incoming connections from external endpoints, an application tier, and a back-end database tier.

Figure 14:
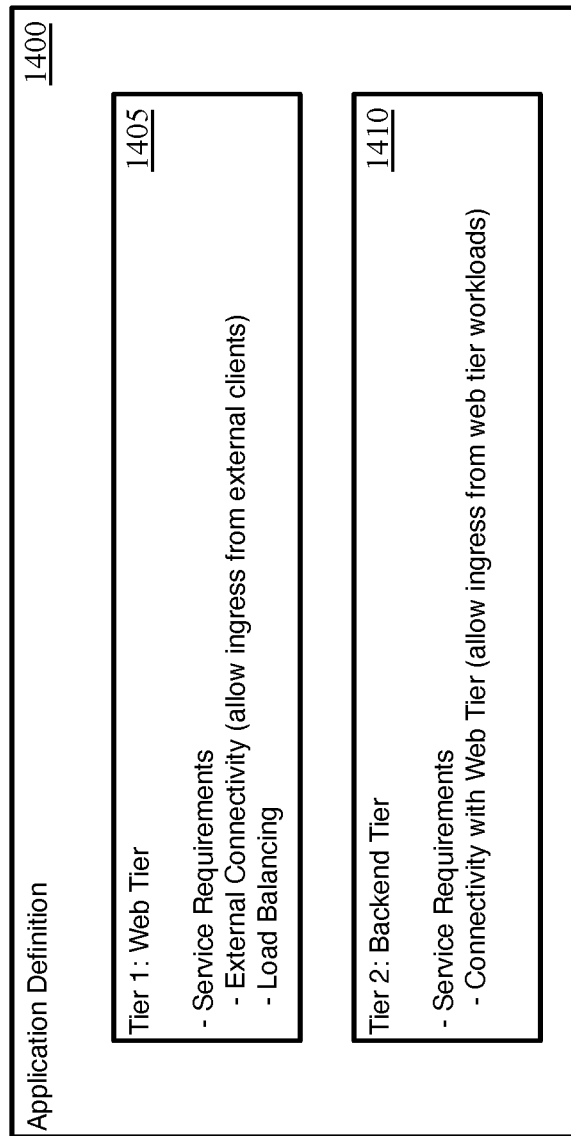
FIG. 14 conceptually illustrates an example application definition according to some embodiments.

FIG. 14 conceptually illustrates an example application definition 1400 according to some embodiments. The application definition 1400 specifies two tiers, rather than a traditional three-tier application. These two tiers are a web tier 1405 and a backend tier 1410, and each tier specifies its requirements. In some embodiments, from the application developer perspective, an application tier is a set of workloads (e.g., DCNs) that share common networking and security services. The application definition 1400 specifies these required services for each tier. In some embodiments, connectivity requirements are also specified as services. In this case, the web tier 1405 specifies that external connectivity (i.e., allowing ingress from external clients) and load balancing across the DCNs of the tier are required. The backend tier 1410 specifies that connectivity with the web tier 1405 (i.e., allowing ingress from web tier DCNs) is required, but does not specify any other services. Some embodiments might specify additional services such as web application firewall (WAF), intrusion detection and/or protection systems (IDS/IPS), etc.

In some embodiments, certain application service constructs are associated with the VHC, and the application developer can choose from these services when specifying the requirements for an application to be deployed in the VHC. These application service constructs may be exposed to the application developer as templates that indicate the configuration for a particular service (e.g., load balancing, etc.) with a combination of (i) pre-populated configuration elements that do not depend on the application specification, (ii) configuration elements that are populated based on application properties, and (iii) configuration elements that are populated based on explicit application developer input.

Figure 15:
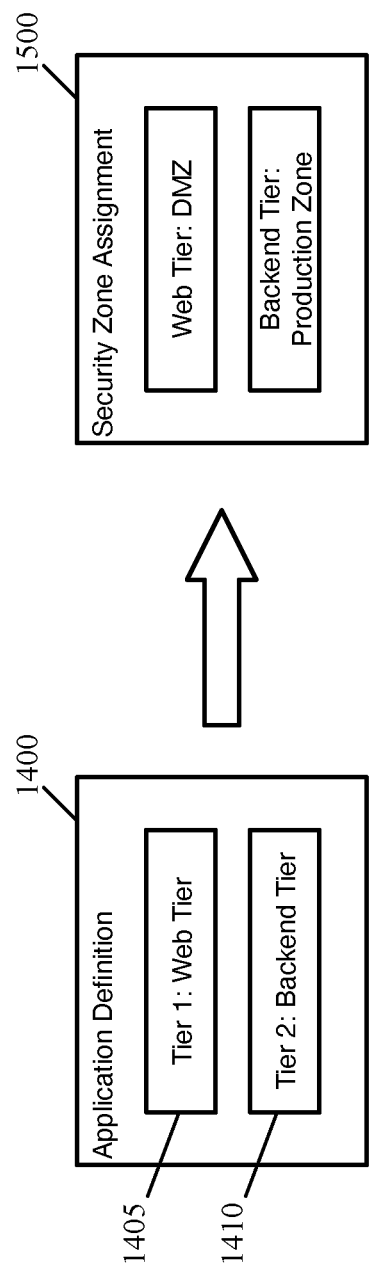
FIG. 15 conceptually illustrates the security zone assignment for the application tiers defined in FIG. 14.

Upon receiving an application definition specifying one or more application tiers for a particular VHC, the network management and control system assigns each of these defined application tiers to one of the security zones defined for the particular VHC based on the requirements of the application (e.g., the connectivity requirements). FIG. 15 conceptually illustrates the security zone assignment 1500 for the application tiers 1405 and 1410. In this example, the web tier 1405 that requires incoming connections from external client endpoints is assigned to the DMZ 1305. The back-end tier 1410 that requires connectivity with the web tier 1410 but should not have any connectivity with external client endpoints is assigned to the production zone 1310. It should be noted that application tiers might also specify connection requirements to other non-application DCNs within the tenant logical network, such as a set of backup servers. So long as these non-application DCNs are assigned to the appropriate security zone (e.g., the production zone), the connections from application DCNs are allowed (even if these non-application DCNs are in a different VHC than the application).

Figure 16:
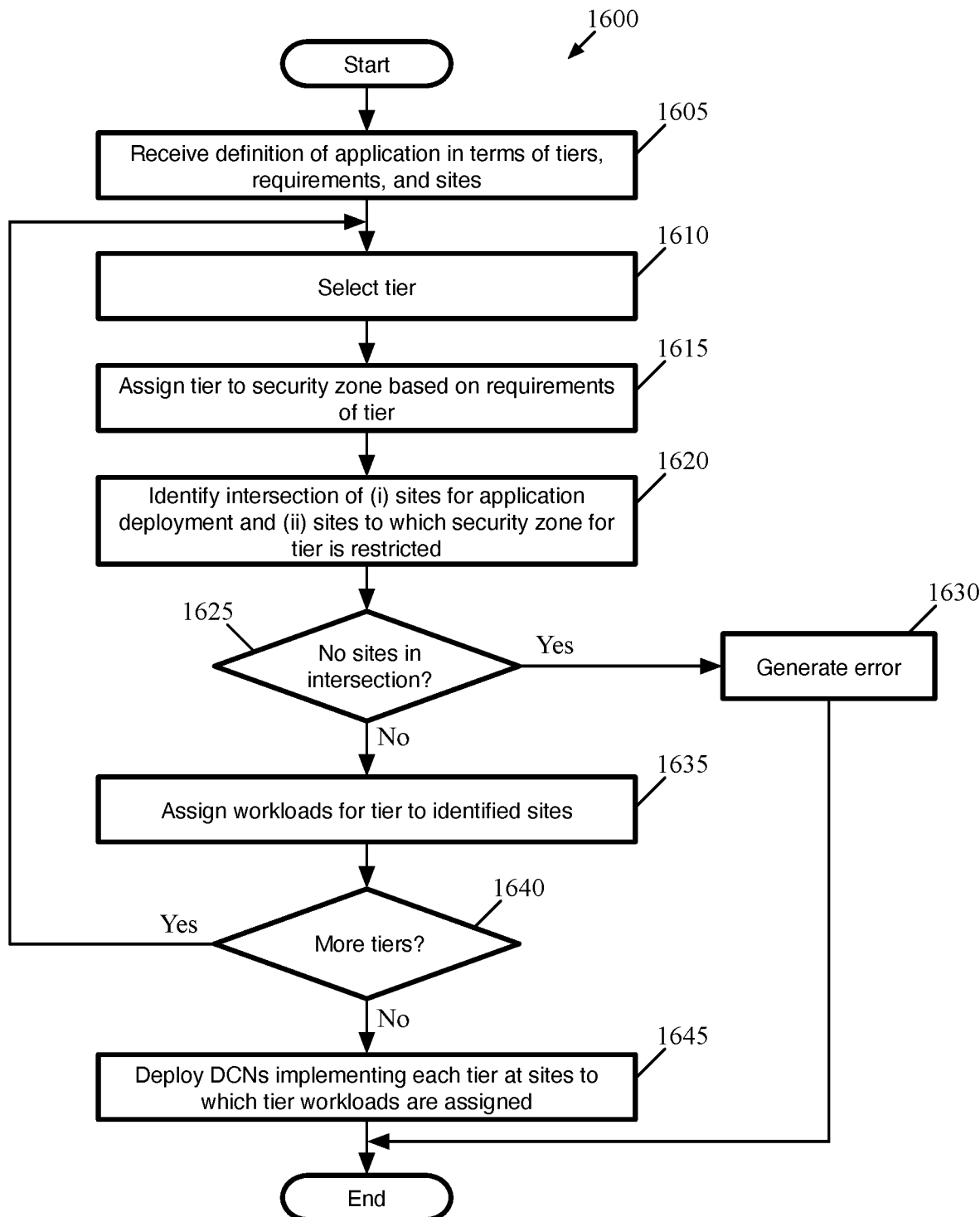
FIG. 16 conceptually illustrates a process of some embodiments for assigning DCNs that implement an application to security zones and different sites of a virtualization infrastructure.

Each VHC is defined to span a set of the sites of the physical infrastructure, and part of the application specification in some embodiments is a set of the sites of the application's VHC across which the application can be deployed. In addition, the VHC owner (or other higher-level user) that defines a security zone defines the span of that security zone in terms of a set of sites to which the security zone is restricted, thereby restricting application tiers assigned to the security zone to those sites. Thus, each application tier is assigned to a subset of the sites designated for the application that is the intersection of (i) the sites designated for the application and (ii) the sites to which the security zone for that application tier is restricted. That is, the DCNs implementing the application tier are deployed within the subset of sites to which the application tier is assigned. If there is no overlap between the sites designated for an application and the sites to which a security zone for a tier of the application is restricted, some embodiments generate an error and alert the application developer user of the error so that the application developer can designate a different set of sites for the application FIG. 16 conceptually illustrates a process 1600 of some embodiments for assigning DCNs that implement an application to security zones and different sites of a virtualization infrastructure. The process 1600 is primarily performed in some embodiments by a network management and control system upon receiving an application definition, although as noted above the actual deployment of DCNs may be performed by a compute manager (e.g., working in tandem with the network management system). The process 1600 will be described in part by reference to FIGS. 17-19, which illustrate the distribution of security zones across sites associated with a VHC and the assignment of example application tiers to these sites.

Figure 17:
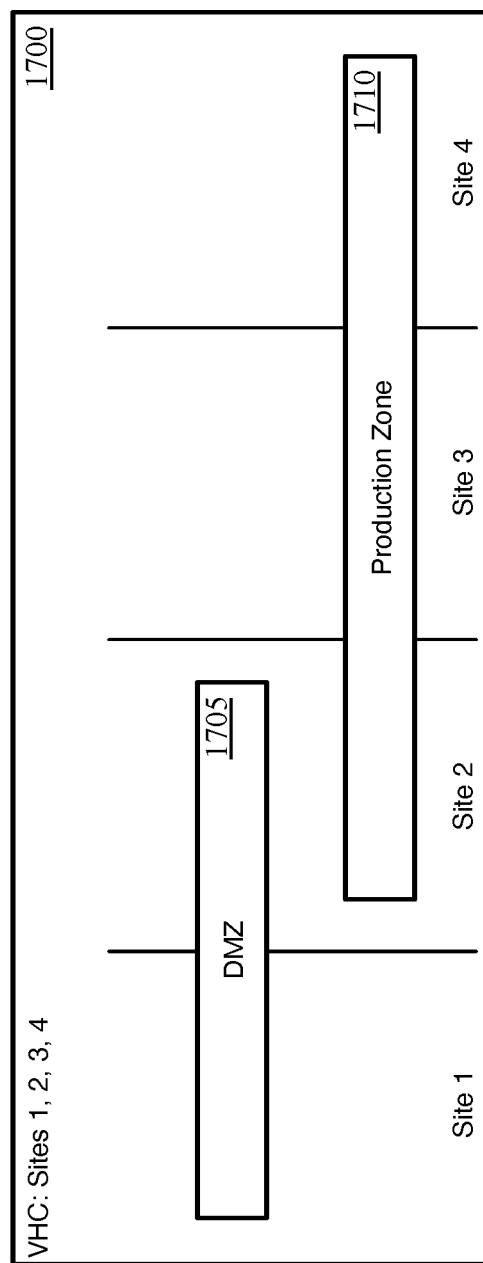
FIG. 17 conceptually illustrates a VHC defined across four sites.

Specifically, FIG. 17 conceptually illustrates that a VHC 1700 is defined across four sites 1-4. Two security zones, a DMZ 1705 and a production zone 1710 are defined for this VHC 1700. The DMZ 1705 is restricted to sites 1 and 2, while the production zone 1710 is restricted to sites 2-4. These security zones 1705-1710 are defined according to the specification shown in FIG. 13 and will be used for the examples shown in FIGS. 18-19 to more fully describe the process 1600.

As shown, the process 1600 begins by receiving (at 1605) a definition of an application to be deployed in a particular VHC. The application definition, in some embodiments, specifies the tiers of the application, requirements for each tier of the application, and a set of sites across which the application can be deployed. In some embodiments, the sites specified for an application may only include sites with which the particular VHC is associated (e.g., in the case of FIG. 17, only sites 1-4 may be included in any application definitions for the VHC 1700). As described above, the applications may include widely used applications as well as proprietary applications specific to a business's needs. The requirements specified by the application definition may include connectivity requirements (e.g., whether external connectivity is required) and/or other service requirements (e.g., load balancers, etc.).

Figure 18:
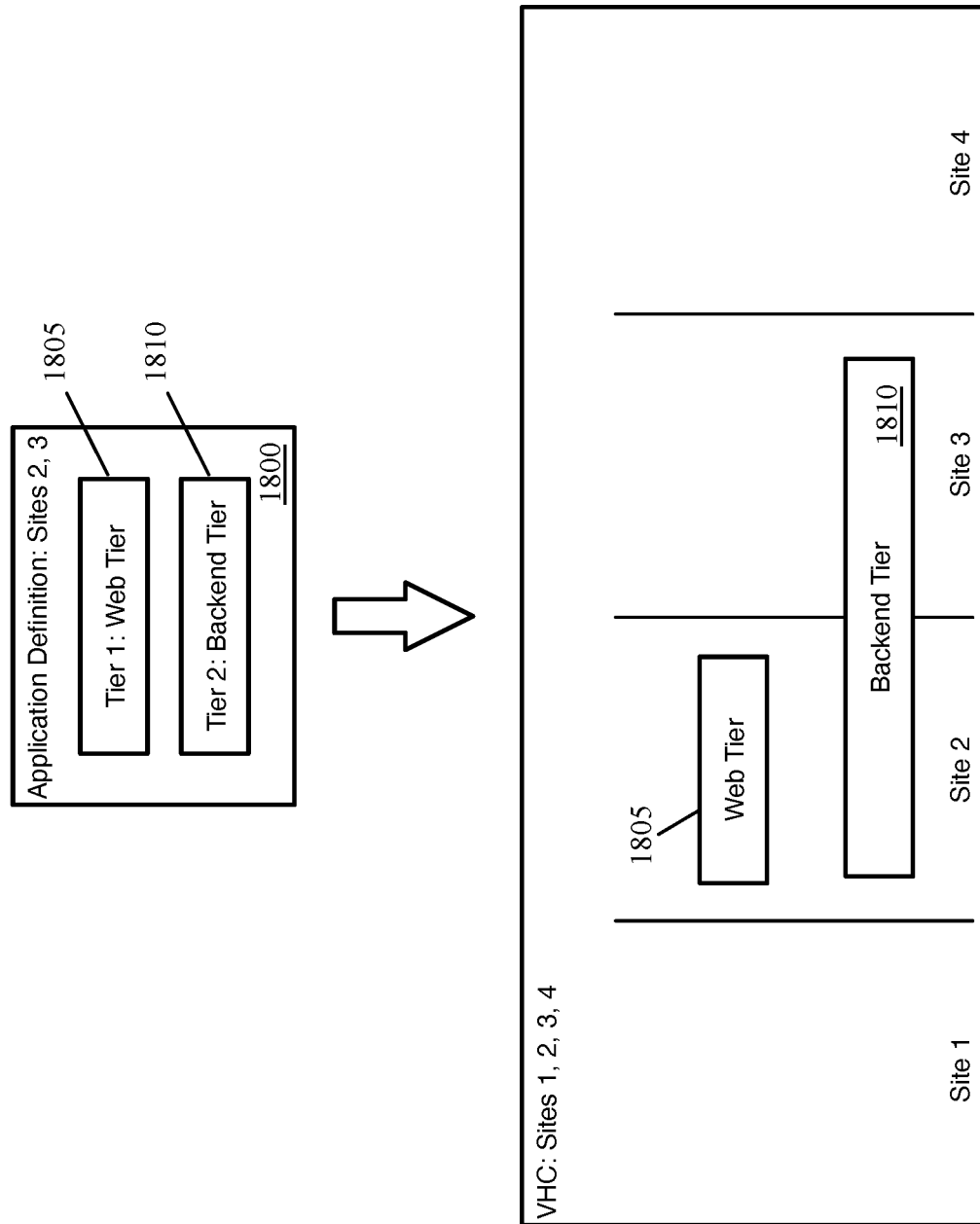
FIGS. 18 and 19 conceptually illustrate the specification of application definitions for the VHC of FIG. 17.
Figure 19:
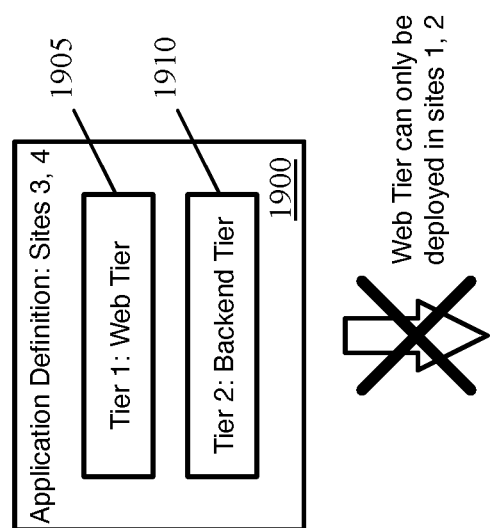

FIGS. 18 and 19 conceptually illustrate the specification of application definitions 1800 and 1900, respectively. The application definition 1800 specifies a web tier 1805 and a backend tier 1810, while indicating that the application can be deployed in sites 2 and 3. Meanwhile, the application definition 1900 specifies a web tier 1905 and a backend tier 1910, while indicating that the application can be deployed in sites 3 and 4.

Returning to FIG. 16, the process 1600 selects (at 1610) one of the specified application tiers so as to assign the DCNs of that application tier to a security zone and identify the sites for the application tier. It should be understood that while this process 1600 individually assesses the tiers serially, this is merely a conceptual process. The actual network management and control system of some embodiments evaluates all of the tiers in parallel to assign the tiers to security zones and determine the sites for each tier.

The process 1600 assigns (at 1615) the selected tier to a security zone based on the requirements of the tier. In both of the examples, as in FIG. 14, the web tiers 1805 and 1905 are assigned to the DMZ 1705 while the backend tiers 1810 and 1910 are assigned to the production zone 1710 based on their requirements (i.e., the web tier requiring external connectivity and the backend tier requiring connectivity with the web tier but no external connectivity).

Next, to determine the sites for the selected tier, the process 1600 identifies (at 1620) the intersection of (i) the sites designated for the application and (ii) the sites to which the assigned security zone for the selected application tier is restricted. That is, each application tier is restricted by two factors: the DCNs implementing that tier can only be deployed in sites that are both (i) specified for the application by the application developer and (ii) specified for the security zone to which the tier is assigned by the user that defined the security zone (e.g., the user that manages the VHC).

Based on this identification, the process 1600 determines (at 1625) whether there are any sites included in the intersection (i.e., whether or not the intersection is the null set). If there are no sites that satisfy both of these criteria, then the process 1600 generates (at 1630) an error. In FIG. 19, the web tier 1905 is assigned to the DMZ 1705. However, the application definition specifies for the application to be deployed in sites 3 and 4, while the DMZ only spans sites 1 and 2. Accordingly, an error is returned to the application developer (e.g., indicating that the connectivity requirements of the web tier require that the application include at least one of sites 1 and 2 in the application specification).

On the other hand, if at least one site satisfies both of the criteria for the selected tier, then the process 1600 assigns (at 1635) the workloads (e.g., the DCNs) for the tier to the identified site(s). FIG. 18 illustrates that the web tier 1805 is assigned only to site 2, while the backend tier 1810 is stretched across sites 2 and 3. This is because the web tier 1805 is assigned to the DMZ 1705, which is restricted to sites 1 and 2 (with the application only assigned to site 2 among these sites). Meanwhile, the backend tier 1810 is assigned to the production zone 1710, which is restricted to sites 2-4 (with the application assigned to both site 2 and site 3 among these sites). Some embodiments always stretch each tier across all the sites to which the tier is assigned, while other embodiments employ various optimization algorithms to determine whether each tier should be stretched across multiple available sites. For instance, when possible, some embodiments try to assign workloads to the sites in which all of the application tiers overlap (e.g., site 2 in the example of FIG. 18). Other embodiments allow for each tier to be stretched across all of its assigned sites but use traffic optimization to determine to which site each actual DCN is deployed.

Next, the process 1600 determines (at 1640) whether additional tiers of the application remain to be evaluated. If additional tiers remain, the process returns to 1610 to select the next tier. As noted previously, the process 1600 is a conceptual process, and some embodiments actually evaluate all of the tiers at the same time.

Once all of the tiers have been evaluated (and no errors are generated), the process 1600 deploys (at 1645) DCNs implementing each tier at the sites to which the tier workloads are assigned. In some embodiments, this deployment operation is actually performed by a compute manager that is separate but works in conjunction with the network management system. The DCNs may be VMs, containers, or other types of DCNs in different embodiments, and are deployed with software required to implement the respective application tier. The deployment, in some embodiments, also enables these DCNs to attach to the appropriate logical ports of the logical switches (or other logical forwarding elements) to which the DCNs are connected according to the determined logical networking constructs for the application, which is described in more detail below.

As part of the process of assigning application tiers to security zones, the network management and control system of some embodiments automatically generates various sets of firewall rules in order to implement the security zones for the application. These firewall rules enforce the required ability or inability of DCNs in different security zones to communicate with each other and/or with external sources. In some embodiments, the firewall rules defined to implement security zones for an application include both distributed firewall rules (enforced by managed forwarding elements and/or firewall modules executing in virtualization software of host computers) and gateway firewall rules (enforced by the edge devices or firewalls connected to the edge devices).

Figure 20:
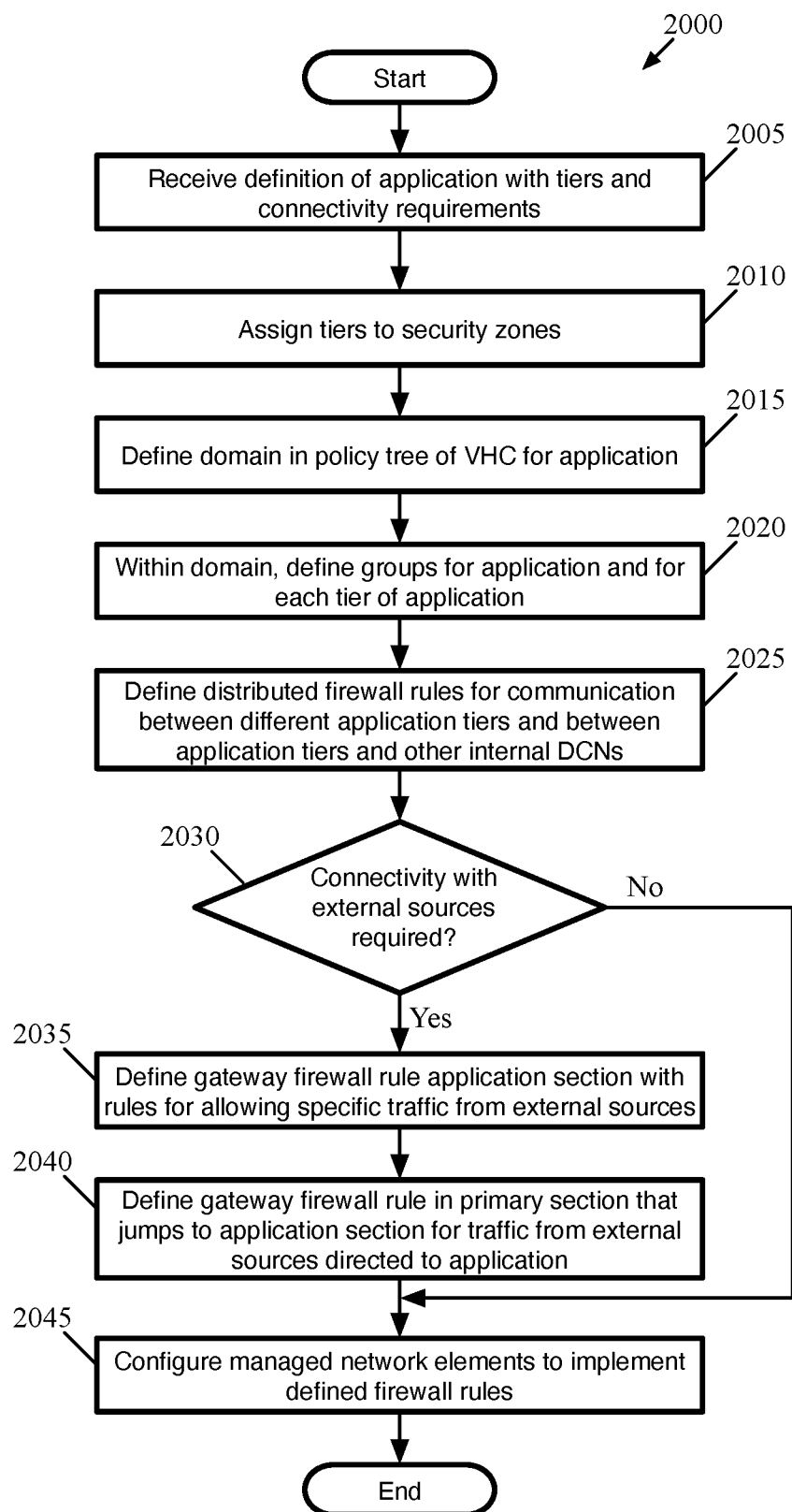
FIG. 20 conceptually illustrates a process of some embodiments for automatically generating security constructs, including firewall rules, relating to an application.

FIG. 20 conceptually illustrates a process 2000 of some embodiments for automatically generating security constructs, including firewall rules, relating to an application. The process 2000 is primarily performed by a network management and control system in some embodiments upon receiving an application definition. It should also be understood that the process 2000 describes only one possible set of security constructs that could be defined by the network management system to enforce the security zones to which an application is assigned, and that other similar processes that define similar sets of security constructs are also possible in different embodiments.

As shown, the process 2000 begins by receiving (at 2005) a definition of an application specifying the tiers of the application and the connectivity (and other) requirements for each of the tiers. As mentioned, some of these requirements are specified in terms of application services that will be consumed by the application. In some embodiments, the application developer is required to provide values for certain services according to application service templates The process 2000 then assigns (at 2010) the tiers to security zones, as described above (e.g., by reference to FIG. 16). These assignments are based at least in part on the connectivity requirements specified for each tier. Multiple tiers of an application might be assigned to the same security zone (e.g., for a 3-tier application, the app tier and database tier could both be assigned to a production security zone). Based on these assignments, as well as the application definition (e.g., the different tiers), the process 2000 generates various security constructs.

The process 2000 defines (at 2015) a domain for the application in the policy tree of the VHC in which the application is defined. As described above, a domain in some embodiments is a logical construct that serves as an envelope for various security groups and policies. While the process 2000 described herein defines one domain for the application (with all of the security groups relating to the application), some embodiments define a separate domain for each of the services specified by the application.

In this case, within the domain, the process 2000 defines (at 2020) security groups for (i) the application and (ii) each tier of the application. A given DCN may belong to numerous different security groups. For instance, a DCN that is part of the web tier of an application could belong to a first security group for any DCN implementing the application, a second security group for DCNs implementing the web tier of the application, a third security group including any DCNs executing a particular operating system, a fourth security group for DCNs assigned to the DMZ (assuming that the web tier is assigned to this security zone), etc.

The process 2000 also defines (at 2025) distributed firewall rules to allow communication (i) between different application tiers that need to be able to communicate with each other and (ii) between application tiers and other internal DCNs if this communication is required. In some embodiments, the distributed firewall rules specify to either allow or deny specific traffic (e.g., from one or more source security groups to one or more destination security groups). Specifically, some embodiments use a whitelisting scheme, in which all traffic is assumed to be blocked unless specifically allowed by a firewall rule (e.g., by having a default rule denying traffic that does not meet any other rule). As an example of such a rule, traffic from the web tier of an application to the database tier of that application can be allowed with a distributed firewall specifying to allow traffic with the web tier security group as the source and the database tier security group as the destination. In addition, certain applications may require connections with DCNs internal to the virtualization infrastructure. For instance, a particular tenant might setup backup servers for use by multiple applications in a VHC or a set of VHCs. In some embodiments, these backup servers (or other services with which multiple applications communicate) are created as a separate application, and distributed firewall rules are defined so as to allow traffic between the backup servers and the application tiers that require connectivity with the backup servers. In some embodiments, each connectivity requirement is specified in terms of an application service that in turn specifies one or more distributed (or gateway) firewall rules based on the application specifics.

In addition, the process 2000 determines (at 2030) whether connectivity with external sources is required. In some embodiments, this connectivity is specified as an application service requirement for a specific tier of the application and invokes the creation of specific firewall rules. Because this traffic passes through the T0 logical router SR (i.e., the gateway at an edge device), some embodiments generate gateway (edge) firewall rules (i.e., firewall rules associated with the SR) to allow certain traffic to (and from) the application.

If connectivity is required with external sources, the process defines (at 2035) a firewall rule application section (i.e., section of firewall rules specific to the application) for allowing specific traffic from external sources to the application. In some embodiments, the gateway firewall rules (and, separately, the distributed firewall rules) are arranged in sections. The firewall rules have relative priorities within a section, and the sections have different priorities as well, so that the highest priority rule in the highest priority section is the highest priority rule overall. The primary (highest priority) section in some embodiments is created and managed by the user that governs the logical router—e.g., the provider for a T0 logical router, or a tenant user for a T1 logical router. In addition, some embodiments generate a section for each security zone (e.g., a section for the DMZ, a section for the production zone, etc.), as well as a separate (lower-priority) section for the application. Within the application section, the process 2000 adds a rule allowing specific traffic from external sources (e.g., from the Internet, from any IP address, etc.) directed to the application. In certain cases, this rule might use a public IP address used by the application, rather than the actual IP addresses of the web tier of the application, as this public IP address will be used in traffic processed by the T0 gateway (before performing network address translation on the traffic). The rule allowing certain traffic might also be configured to only allow connections from certain addresses, depending on the specified connectivity requirement for the application. In addition, the application section typically includes a default rule specifying that any other traffic that does not meet the specified criteria is to be denied.

The process 2000 also defines (at 2040) a gateway firewall rule in the primary section that jumps to the application section for traffic from external sources directed to the application. This primary section might be the highest-priority application section managed by the provider as part of the T0 gateway or could be a section associated with the specific security zone that receives incoming connections (e.g., the DMZ). That is, this primary firewall rule section should not be configured to allow all incoming traffic received at the gateway, and therefore has a default rule denying traffic. Rather than specifically allowing traffic at a higher priority, a rule with a new type of action skipping the rest of the section (and jumping to the application section) is generated so that data traffic directed to the application is referred to the lower-priority application firewall rule section. The details of whether to allow or deny such incoming traffic are therefore handled by the rules generated for that section (at 2035). This new rule might identify the incoming traffic for the application based on a destination address and/or transport layer port in the packet, or a determination that the packet is directed to a particular logical port of the logical router associated with the application.

After generating the required firewall rules for the application, the process 2000 configures (at 2045) managed network elements to implement the defined firewall rules. As noted previously, the distributed firewall rules are implemented by the internal physical infrastructure (e.g., managed forwarding elements and/or firewall modules in virtualization software of host computers) of some embodiments, and the network management and control system configures these elements to use the newly generated firewall rules. Similarly, the edge devices that implement the T0 SRs also implement the gateway firewall rules in some embodiments, and the network management and control system also configures these edge devices and/or their associated edge firewalls.

Figure 21:
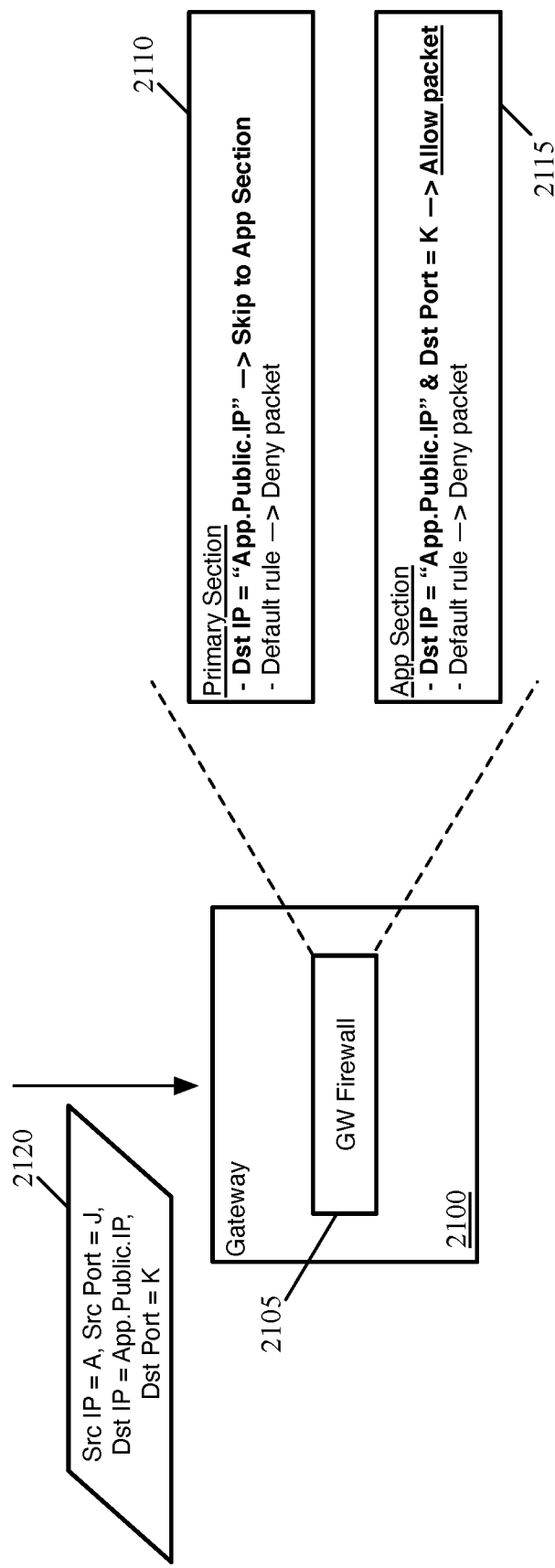
FIGS. 21 and 22 conceptually illustrate the use of firewall rules to allow and deny different traffic at a gateway.
Figure 22:
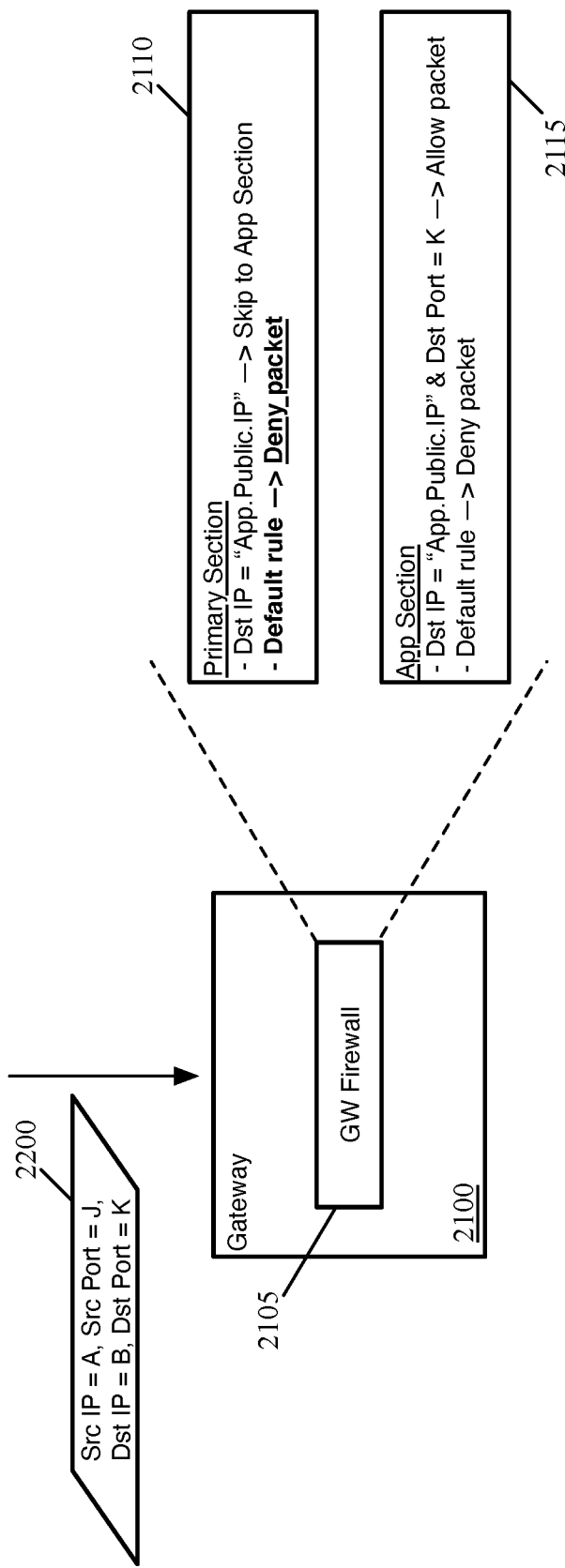

FIGS. 21 and 22 conceptually illustrate the use of these rules to allow and deny different traffic at a gateway 2100. As shown, the gateway 2100 implements a gateway firewall (in addition to implementing various logical forwarding elements and other services). The gateway firewall 2105 may be executed by the same datapath that implements the logical forwarding elements, a separate element, or even a separate (e.g., third-party) device connected to the physical gateway edge device 2100, in different embodiments.

The gateway firewall 2105 includes firewall rules in at least two sections. The primary section 2110 includes a first rule specifying that if the destination IP address of a data message is "App.Public.IP" (i.e., the public IP address used by a particular application), then the action to be taken is to skip to the application section 2115 (without making a final decision on whether to allow or deny the packet). The primary section 2110 also includes a second rule that denies any other incoming data messages. The application section 2115 includes a first rule specifying that if the destination IP address of a data message is "App.Public.IP" and the destination transport layer port is "K", then the data message should be allowed. That is, the application connectivity requirements, as translated to firewall rules, require that data messages directed to the application also specify the correct transport layer port K. The section 2115 also includes a default deny rule.

In FIG. 21, the gateway 2100 receives a data message 2120 with a source IP address A, destination IP address "App.Public.IP", source transport layer port J, and destination transport layer port K. During the processing of the data message 2120, the gateway firewall 2105 first checks the primary section 2110, and the data message 2120 matches the first rule. Accordingly, the gateway firewall 2105 skips to the application section 2115. Here, because the data message 2120 is correctly directed to the application (using the correct IP address and port number), the gateway firewall 2105 allows the data message.

In FIG. 22, the gateway 2100 receives a second data message 2200 with a source IP address A, destination IP address B, source transport layer port J, and destination transport layer port K. During the processing of the data message 2200, the gateway firewall 2105 first checks the primary section 2110. Here, the data message 2200 does not match the first rule, and thus the second rule is applied to deny the data message. Thus, only data messages directed to the application IP address are processed by the application section 2115; other data messages are denied by the primary section 2110.

In addition to assigning application tiers to security zones and defining firewall rules for the applications, some embodiments automatically generate logical networking constructs based on the application definition. Specifically, some embodiments allow the user that manages a VHC (or a higher-level user) to define application association policies for the VHC. These application association policies, in some embodiments, specify how an application definition with one or more tiers is translated into logical networking constructs (e.g., logical routers, logical switches, etc.).

Figure 23:
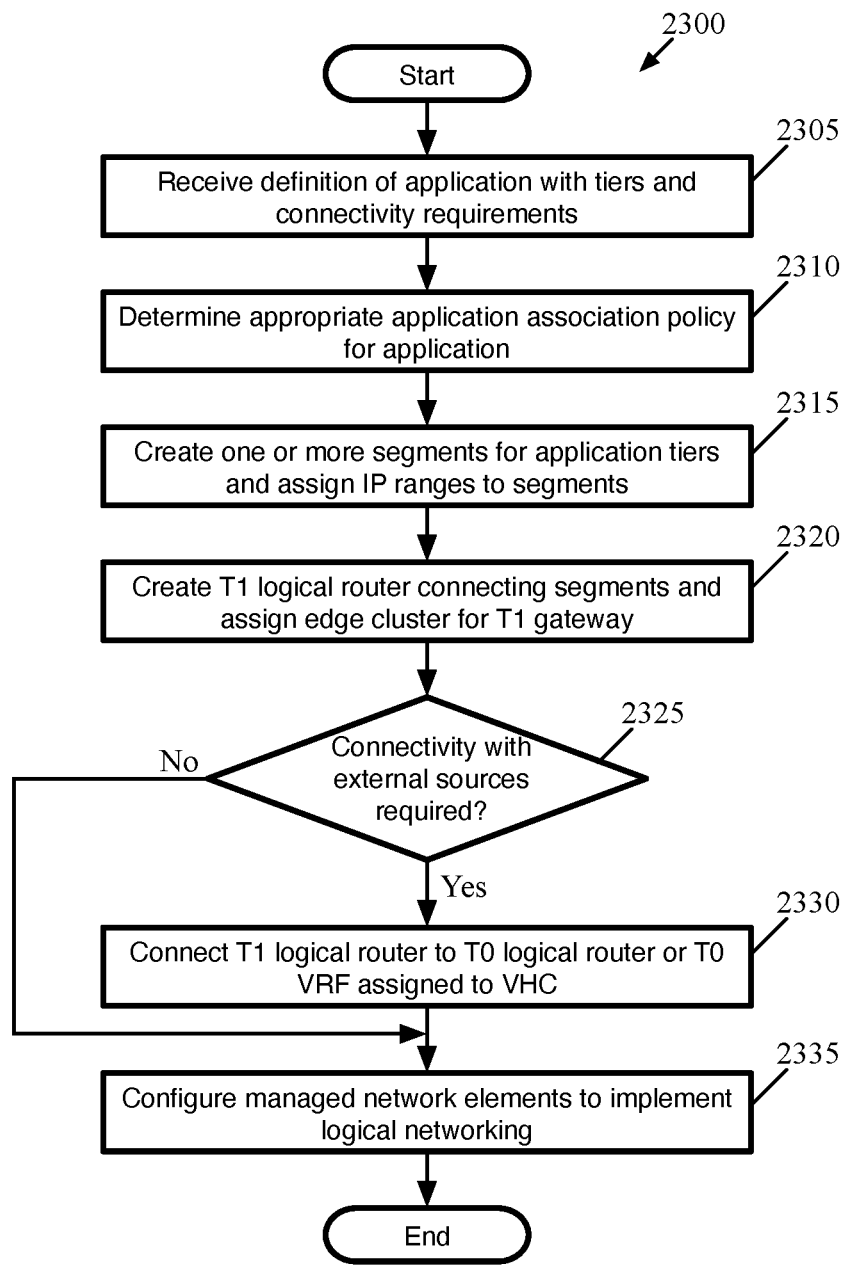
FIG. 23 conceptually illustrates a process of some embodiments for generating logical networking constructs (e.g., logical switches and/or logical routers) and their configuration based on the definition of an application.

FIG. 23 conceptually illustrates a process 2300 of some embodiments for generating logical networking constructs (e.g., logical switches and/or logical routers) and their configuration based on the definition of an application. In some embodiments, the process 2300 is performed by a network management and control system upon receipt of an application definition from an application developer user. The process 2300 will be described at least in part by reference to FIG. 24, which conceptually illustrates a set of application association policies, and FIG. 25, which conceptually illustrates the use of an application association policy to generate logical forwarding elements based on an application definition.

As shown, the process 2300 begins by receiving (at 2305) a definition of an application to be deployed in a VHC specifying one or more tiers and connectivity requirements (as well as other types of requirements) for each of the tiers. As described above, the application definition of some embodiments specifies the number of tiers, connectivity and other service requirements for each tier, and other information. In some embodiments, if the application is a common application type (e.g., Epic, SharePoint, etc.), the application developer user may use a template provided by the network management system for the application that uses a standard set of tiers and requirements for the application type, with minimal customization. If the application is a proprietary application, then some embodiments require additional customization (e.g., the number of tiers, specific connectivity requirements) from the application developer.

Based on the application definition, the process 2300 determines (at 2310) an appropriate application association policy of the VHC in which the application is to be deployed to use for generating logical networking constructs for the application. In some embodiments, the manager of the VHC affiliates one or more application association policies (which may be pre-defined for the system or generated by the user that manages the VHC) with the VHC. Different application association policies may specify different logical networking constructs based on the number of tiers in the application (e.g., different policies for 2-tier and 3-tier applications), whether the application is a specific type of application (e.g., there might be a first policy for SharePoint applications, a second policy for blog applications, etc.), or based on other factors.

Figure 24:
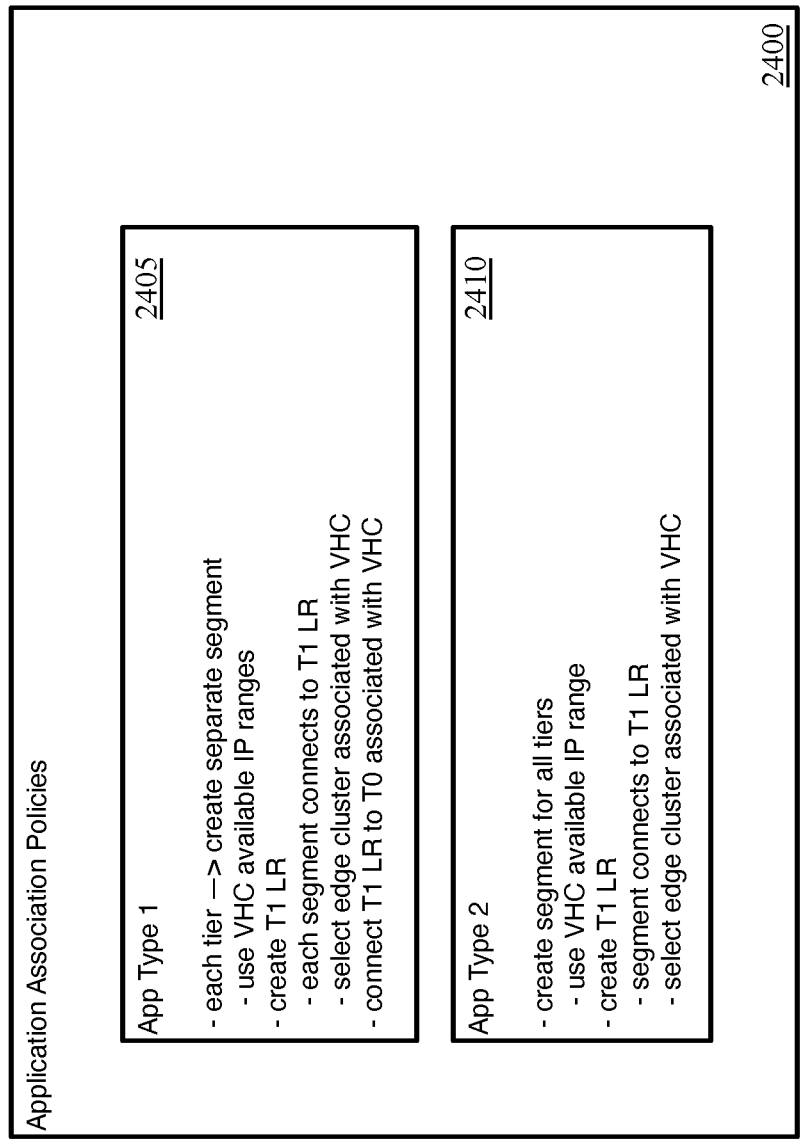
FIG. 24 conceptually illustrates a set of application association policies for a VHC according to some embodiments.

FIG. 24 conceptually illustrates a set of application association policies 2400 for a VHC according to some embodiments. The application association policies 2400, in this case, include two different policies 2405 and 2410 for two different types of applications. As shown, each of these application association policies specifies instructions for generating and configuring logical forwarding elements to which logical network endpoints (DCNs) implementing the applications connect.

The first application association policy 2405 (for Type 1 applications) specifies to create a separate segment (e.g., logical switch) for each tier of the application and to use IP address ranges available to the VHC to assign subnets for each of these segments. That is, the VHC will have been assigned a set of private IP addresses (e.g., by the tenant user that creates the VHC or creates the user that creates the VHC) to be used for the DCNs in the VHC for communication internal to the virtualization infrastructure. The application association policy specifies to select a subnet from within this set of IP addresses to associate with the logical switch; DCNs added to the logical switch will be assigned an IP address from within the subnet. The application association policy 2405 also specifies to create a T1 logical router to which each of the newly created segments attaches. Assuming that at least one edge cluster in the physical infrastructure has been associated with the VHC, the application association policy 2405 specifies for this edge cluster to be selected for hosting the SR(s) for the T1 logical router. Finally, the application association policy 2405 specifies for the T1 logical router to be connected to the T0 logical router or T0 VRF (e.g., of the provider network) that is associated with the VHC in which the application is deployed.

The second application association policy 2410 (for Type 2 applications, which in this case do not require external connectivity and may also have other specific properties) specifies to create a single segment for all tiers of the application and to use an IP address range available to the VHC to assign a subnet for the segment. That is, for these applications, all of the DCNs implementing any of the application tiers are connected to the same logical switch. In this case, some embodiments differentiate the tiers using compute expressions associated with the DCNs, so that the DCNs can still be easily assigned to different security groups for the different tiers. For instance, different embodiments have the compute manager assign tags or other metadata to the DCNs that indicate to which tier each DCN belongs. Other embodiments use specific IP addresses within the logical switch subnet to differentiate the tiers. As shown, a T1 logical router is still created according to the second application association policy 2410. In addition, the logical switch is still connected to this T1 logical router and an edge cluster associated with the VHC is selected to host the SR(s) for the T1 logical router. The T1 logical router is not connected to any T0 logical router or VRF in this case, as external connectivity is presumably not needed. This application association policy 2410 could be used for applications in a testing phase in some embodiments.

Returning to FIG. 23, the process 2300 creates (at 2315) one or more segments (logical switches) for the application tiers and assigns IP ranges to the segments. In some embodiments, depending on the application association policy identified for the application definition, either one logical switch may be defined for each tier or a single logical switch is defined for the application as a whole (that is shared between the tiers). As mentioned, if a single logical switch is defined, then some embodiments differentiate the tiers using compute expressions associated with the DCNs, so that the DCNs can still be easily assigned to different security groups for the different tiers.

The process 2300 also creates (at 2320) a T1 logical router to connect the one or more segments created for the application tiers and assigns one or more edge clusters for the T1 gateway (i.e., the T1 SR). It should be noted that if no centralized services are required for the T1 logical router (e.g., if the only purpose of the T1 logical router is to connect the logical switches), then the T1 logical router may be entirely distributed and no edge cluster assignment is required.

The process 2300 then determines (at 2325) whether connectivity with external sources is required. It should be noted that the process 2300 is a conceptual process, and in some embodiments this determination is part of the determination as to the appropriate application association policy. That is, whether or not connectivity is required goes into determining the application association policy, and the logical networking constructs to be generated are simply specified by that policy.

When external connectivity is required for the application (e.g., for a particular tier of the application), the process 2300 connects (at 2330) the T1 logical router created for the application to the T0 logical router or T0 VRF that is assigned to the VHC in which the application will be deployed. Whether the T0 logical router or one of multiple VRFs associated with the T0 logical router is assigned to the VHC depends on which entities are exposed to the tenant by the provider (and, in turn, which entities the tenant assigns to the sub-user that manages the VHC if the VHC is not directly managed by the tenant user).

Figure 25:
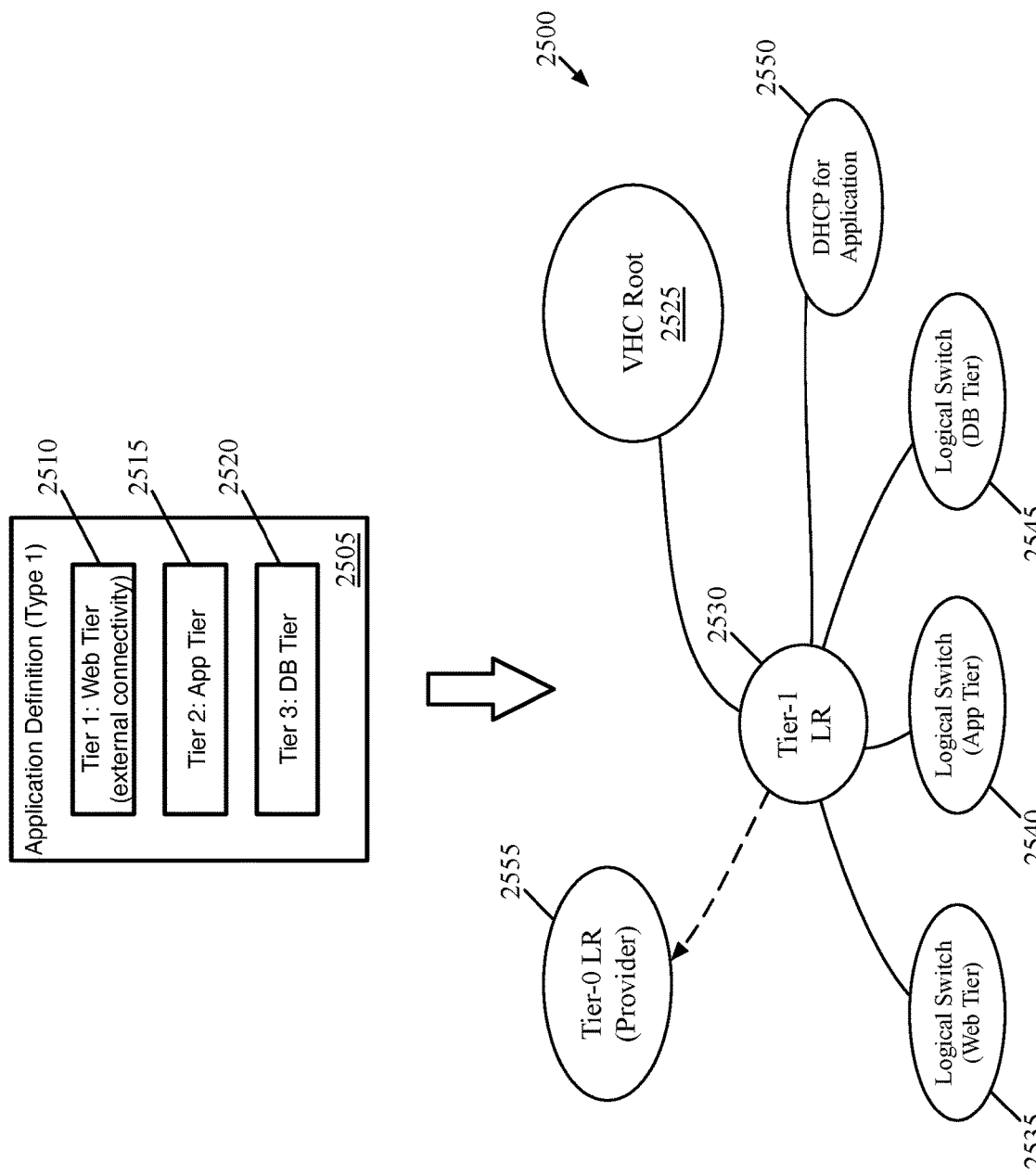
FIG. 25 conceptually illustrates an example set of logical network elements defined in a policy tree for an application definition.

FIG. 25 conceptually illustrates an example set of logical network elements defined in a policy tree 2500 for an application definition 2505. As shown, the application definition 2505 specifies a web tier 2510, an app tier 2515, and a database tier 2520. This application corresponds to a Type 1 application (i.e., to the application association policy 2405), which may be indicated explicitly or determined based on the application properties.

Based on the application association policy 2405, the network management system defines a set of logical network structures that are shown in the policy tree 2500. It should be understood that this policy tree is not complete, as it does not show either (i) the security constructs defined for the application or (ii) any other logical networking constructs defined within the VHC (e.g., for other applications). Underneath its root node 2525, the policy tree 2500 includes a T1 logical router node 2530 and three logical switch nodes 2535-2545, with each logical switch corresponding to a different tier of the application. In addition, some embodiments define a DHCP service 2550 associated with the T1 logical router for the application. This DHCP service operates (e.g., at the edge cluster with which the T1 logical router 2530 is associated) to assign IP addresses to the DCNs implementing the application tiers that connect to any of the logical switches 2535-2545. Lastly, the T1 logical router is connected to a T0 logical router represented by node 2555, which is part of the provider network but exposed to the VHC represented by the policy tree 2500.

Returning to FIG. 23, the process 2300 configures (at 2335) managed network elements within the virtualization infrastructure to implement the logical networking constructs. As noted previously, the logical forwarding elements are implemented by the internal physical infrastructure (e.g., managed forwarding elements, such as virtual switches and virtual routers executing in virtualization software of host computers) of some embodiments, and the network management and control system configures these elements to process data traffic to and from the application DCNs according to the newly-defined logical forwarding elements. Similarly, the edge devices that implement the SRs for the T1 logical router (if such an SR is created) and the T0 logical router (if the T1 logical router is connected to a T0 logical router or T0 VRF) are also configured to implement these logical forwarding elements in their datapaths.

Figure 26:
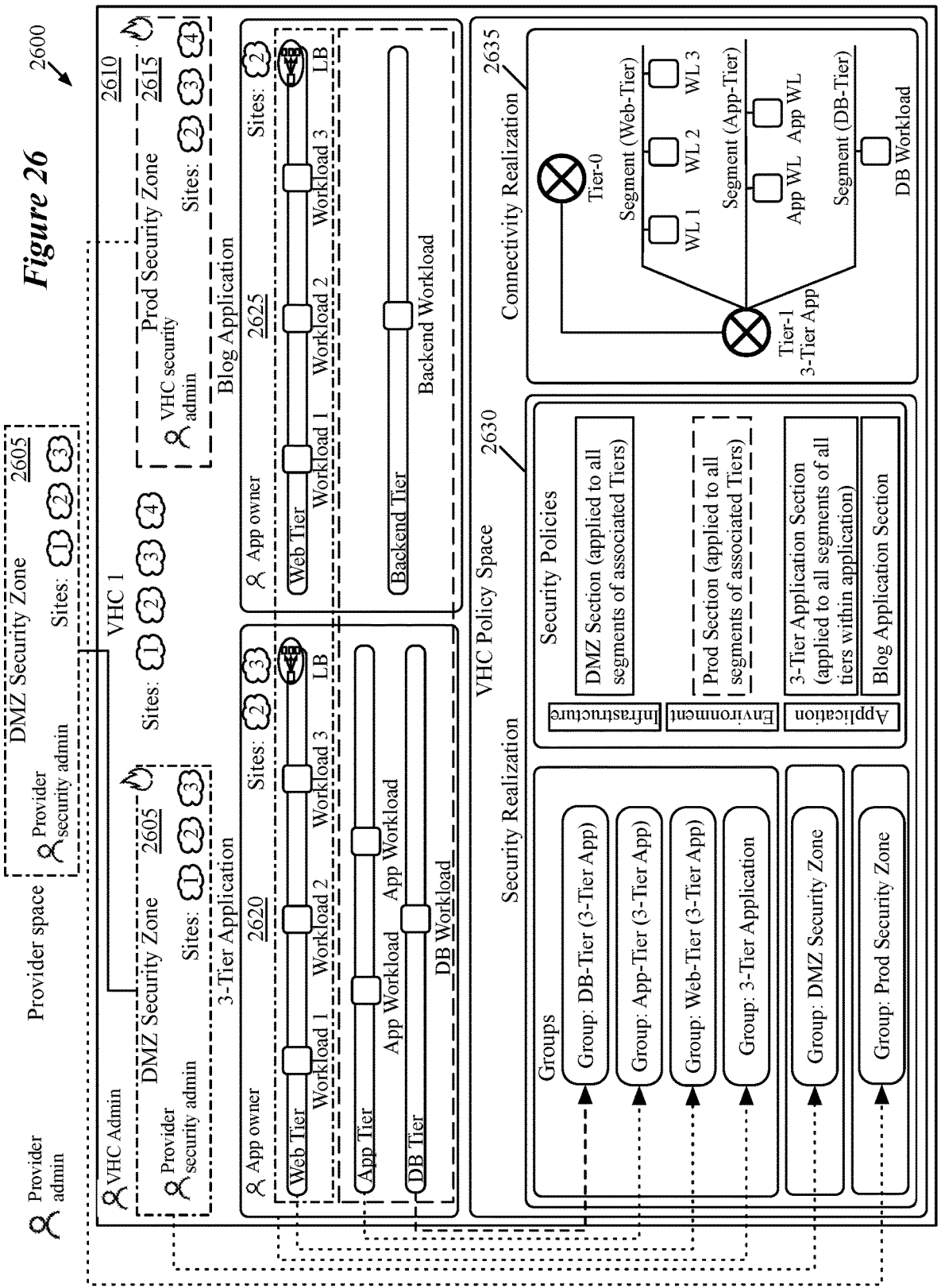
FIG. 26 conceptually illustrates a diagram showing the overall networking and security realization of a set of applications created within a VHC.

FIG. 26 conceptually illustrates a diagram 2600 showing the overall networking and security realization of a set of applications created within a VHC. The diagram 2600 illustrates the different users that manage different aspects of the VHC and applications, as well as the security groups/policies and logical networking constructs defined for one of the applications. As shown, in the provider space that is governed by the provider administrator user (i.e., the highest-level user of the network management and control system managing the virtualization infrastructure), the DMZ security zone 2605 is created. In some embodiments, a provider security administrator defines this security zone 2605, which may be used by not only the VHC 2610 shown in the figure but also other VHCs of the same or other tenants. The DMZ security zone 2605 is restricted to sites 1-3 by the provider security administrator in this case.

The VHC 2610 is managed by a VHC administrator (e.g., a tenant, a sub-user of the tenant, etc.), and is defined to span all of sites 1-4. In addition to the DMZ security zone 2605 associated with the VHC, a VHC security administrator (which may be the same as the VHC administrator or a specific security admin user created by the VHC admin) defines a production security zone 2615 which is restricted to sites 2-4. Unlike the DMZ security zone 2605, the production security zone 2615 is specific to the VHC 2610.

Within the VHC, two different applications 2620 and 2625 have been created by two different application owners. The first application 2620 is a three-tier application with a web tier (assigned to the DMZ security zone 2605, as shown by the dash-dot border), an app tier, and a database tier (both of which are assigned to the production security zone 2615, as shown by the long-dash border). Three workloads (e.g., VMs, containers, etc.) implement the web tier and load balancing is used to distribute traffic between these workloads, two workloads implement the app tier, and one workload implements the database tier. The second application 2625 is a two-tier blog application with a web tier (assigned to the DMZ security zone 2605) and a backend tier (assigned to the production security zone 2615). Three workloads implement the web tier and load balancing is again used to distribute traffic between these workloads, while a single workload implements the backend tier.

The bottom portion of the diagram 2600 shows the security realization 2630 and connectivity realization 2635 for the three-tier application 2620. In this example, security groups are defined for (i) the database tier of the application, (ii) the app tier of the application, (iii) the web tier of the application, (iv) the application itself (a group that would include all workloads in any of the application tiers), (v) the DMZ security zone (i.e., any workloads assigned to this security zone), and (vi) the production security zone. The first four groups are relevant only to this application, and corresponding security groups would be created for the second application 2625 (not shown), while the last two groups corresponding to the security zones are applicable to any other applications deployed in the VHC.

In addition, the security policies are broken down into different sections, shown in order of priority. The highest-priority section is the DMZ section (which includes a rule for each of the applications to skip to the application-specific sections for data traffic between external endpoints and the web tier workloads for those applications), followed by the production section, and then the two application-specific sections of security policies.

The connectivity realization 2635 shows the logical networking configured for the three-tier application 2620. In this case, the three workloads of the web tier are attached to a first segment (logical switch), the two workloads of the app tier are attached to a second segment, and the single workload of the database tier are attached to a third segment. Each of these segments is connected to a T1 logical router defined for the three-tier application, which in turn connects to a T0 logical router (presumably managed by the provider).

Figure 27:
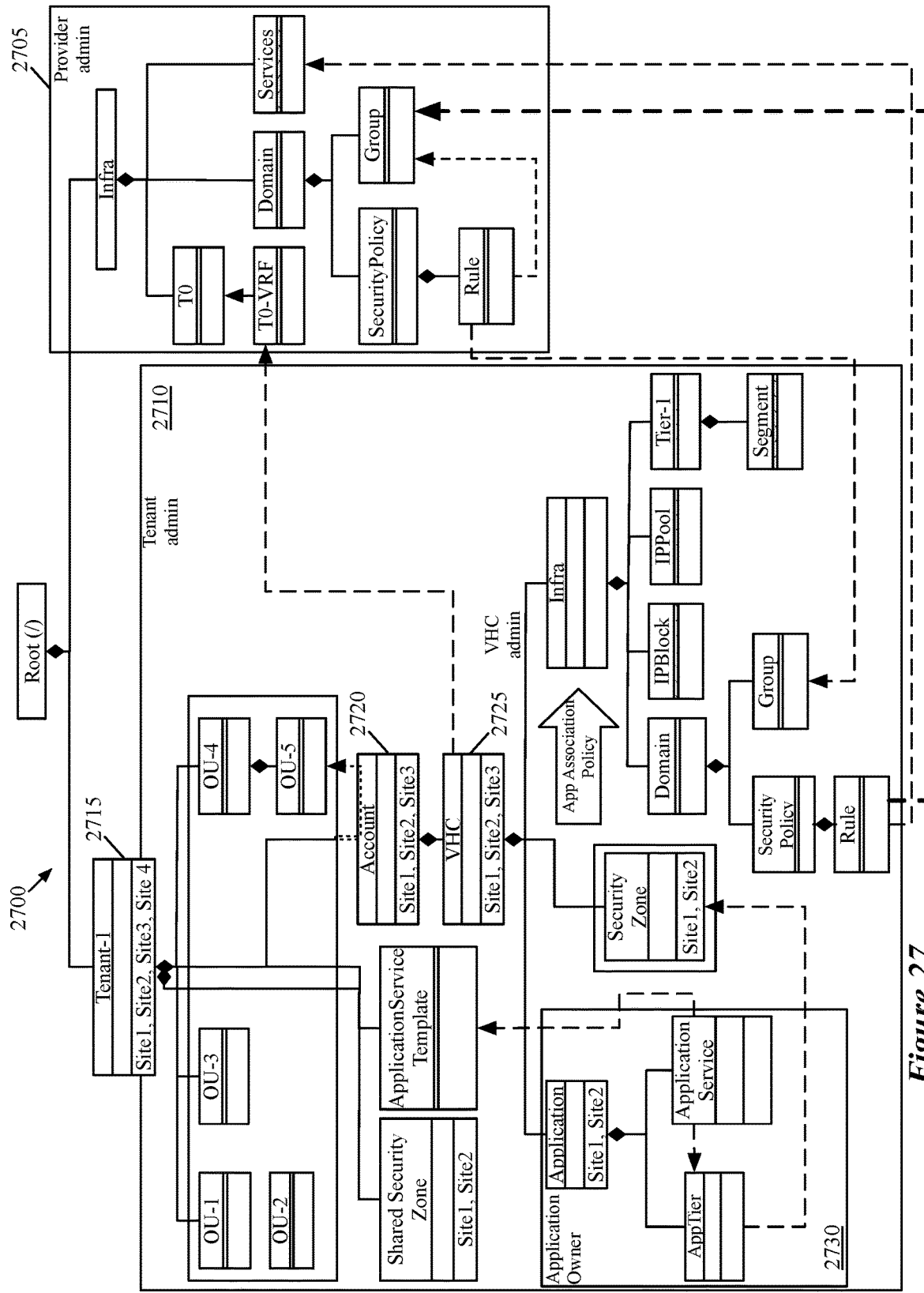
FIG. 27 conceptually illustrates at least a portion of the data model of the network management and control system of some embodiments.

Finally, FIG. 27 conceptually illustrates at least a portion of the data model 2700 of the network management and control system of some embodiments. This data model 2700 defines how logical networking and security constructs, as well as security zones and applications may be defined within the network management and control system. As shown, underneath the root, there is both (i) a provider section 2705 and (ii) a tenant section 2710. The provider section 2705, managed by the provider user(s), allows the provider to define (under the infra root node) logical networking constructs, including T0 logical routers and T0 VRFs belonging to those logical routers. For security aspects, the provider user can define domains containing security policies (with one or more rules) and security groups. In addition, some embodiments allow the provider user to define services (e.g., layer 7 services), which security rules can reference.

The provider user also creates the tenant user 2715, which manages the tenant section 2710 and specifies the physical sites that the tenant may use. It should be understood that any number of tenant users, each managing their own sections, may be created by the provider user. The tenant may specify any number of sub-users, in this case organizational units. Either the tenant directly or these organizational units may specify account sub-users (e.g., the account 2720), and the creator of this account specifies the physical sites that the account may use for its one or more VHCs. The tenant user can also specify one or more shared security zones (e.g., a DMZ) that are shared across all organization units and/or accounts created underneath the tenant, as well as an application service template for connectivity, load balancing, or other services. As described, the application service templates define the configuration (possibly according to details from an application developer) for a service consumed by an application tier, such as external connectivity, communication with backup servers, load balancing, IDS/IPS, etc.

The account user 2720 can also define a VHC 2725, which may be configured by the account user 2720 or a separate VHC admin. Within a VHC 2725, the account user 2720 or the VHC admin can define security zones (in addition to the shared security zones defined at the tenant level) and restrict these security zones to certain sites (so long as those sites are within the purview of the VHC). The account user 2720 or VHC admin can also define application association policies for the VHC that specify how to turn application definitions into logical networking constructs.

An application owner (application developer) governs their application definition 2730, which is under the purview of the VHC 2725. The application owner specifies the application, indicating the sites at which the application can be deployed, as well as one or more application tiers. For each application tier, application services may be invoked for consumption by the tier by reference to application service templates defined by the tenant. Each application tier is automatically associated with a security zone, either one that is defined within the VHC (as in this case) or that is shared between VHCs. In addition, an application association policy is used to generate logical networking constructs (e.g., T1 logical routers, segments) under the root node (infra) for the VHC policy tree definition. This policy tree also includes IP assignment information (IP pools and IP blocks) as well as the security information (domains, security policies with rules, and security groups) either specified by the VHC admin (or other higher-level user) or automatically generated based on the definition of an application for the VHC. The security policy rules in the VHC can refer to services and/or security groups defined within the VHC and/or defined within the provider policy tree. Similarly, security rules within the provider network can refer to services and/or security groups that are defined within the provider policy tree and/or a VHC. These rules can specify the security groups as sources and/or destinations of traffic and indicate whether or not such traffic should be allowed.

FIG. 28 conceptually illustrates an electronic system 2800 with which some embodiments of the invention are implemented. The electronic system 2800 may be a computer (e.g., a desktop computer, personal computer, tablet computer, server computer, mainframe, a blade computer etc.), phone, PDA, or any other sort of electronic device. Such an electronic system includes various types of computer-readable media and interfaces for various other types of computer-readable media. Electronic system 2800 includes a bus 2805, processing unit(s) 2810, a system memory 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the system memory 2825, and the permanent storage device 2835.

From these various memory units, the processing unit(s) 2810 retrieve instructions to execute and data to process in order to execute the processes of the invention. The processing unit(s) may be a single processor or a multi-core processor in different embodiments.

The read-only-memory (ROM) 2830 stores static data and instructions that are needed by the processing unit(s) 2810 and other modules of the electronic system 2800. The permanent storage device 2835, on the other hand, is a read-and-write memory device. This device 2835 is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, etc.) as the permanent storage device 2835. Like the permanent storage device 2835, the system memory 2825 is a read-and-write memory device. However, unlike storage device 2835, the system memory 2825 is a volatile read-and-write memory, such as random-access memory. The system memory 2825 stores some of the instructions and data that the processor needs at runtime. In some embodiments, the invention's processes are stored in the system memory 2825, the permanent storage device 2835, and/or the read-only memory 2830. From these various memory units, the processing unit(s) 2810 retrieve instructions to execute and data to process in order to execute the processes of some embodiments.

The bus 2805 also connects to the input and output devices 2840 and 2845. The input devices 2840 enable the user to communicate information and select commands to the electronic system 2800. The input devices 2840 include alphanumeric keyboards and pointing devices (also called "cursor control devices"). The output devices 2845 display images generated by the electronic system. The output devices 2845 include printers and display devices, such as cathode ray tubes (CRT) or liquid crystal displays (LCD). Some embodiments include devices such as a touchscreen that function as both input and output devices.

Finally, as shown in FIG. 28, bus 2805 also couples electronic system 2800 to a network 2865 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 12, 16, 20, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network management and control system that manages a virtual infrastructure deployed across a set of datacenters, a method comprising:
    based on input from a top-level user of the virtual infrastructure, (i) deploying a first logical network within the virtual infrastructure and (ii) defining a set of one or more second-level users of the virtual infrastructure, wherein the top-level user exposes entities of the first logical network to the set of second-level users via labels that provide information to the set of second-level users about the exposed entities of the first logical network without enabling the set of second-level users to view the configuration of the first logical network entities; and
    receiving input from a particular second-level user of the virtual infrastructure to define a second logical network and connect the second logical network to the first logical network,
    wherein the first and second logical networks use a same data model and wherein the set of second-level users is restricted from viewing configuration of the first logical network.

2. The method of claim 1, wherein the top-level user is an administrator for a provider of the virtual infrastructure and the set of second-level users includes administrators for tenants of the virtual infrastructure.

3. The method of claim 2, wherein the provider of the virtual infrastructure is an enterprise IT team and the tenants comprise different sections of a business of the enterprise.

4. The method of claim 1, wherein the exposed entities comprise a logical router that provides connectivity to external networks, wherein the particular second-level user connects a logical router of the second logical network to the exposed logical router in order to provide connectivity to the external networks for data compute nodes (DCNs) of the second logical network.

5. The method of claim 4, wherein the exposed entities comprise a particular virtual routing and forwarding (VRF) table of the logical router of the first logical network that provides connectivity to external networks.

6. The method of claim 1, wherein the exposed entities comprise a security group, wherein the particular second-level user defines firewall rules for the second logical network using the security group such that the firewall rules apply to DCNs of the second logical network that belong to the security group.

7. The method of claim 1, wherein the exposed entities comprise a physical infrastructure entity.

8. The method of claim 1, wherein the top-level user is enabled to view and configure physical infrastructure entities that are hidden from the set of second-level users.

9. For a network management and control system that manages a virtual infrastructure deployed across a set of datacenters, a method comprising:
    based on input from a top-level user of the virtual infrastructure, (i) deploying a first logical network within the virtual infrastructure and (ii) defining a set of one or more second-level users of the virtual infrastructure;
    receiving input from a particular second-level user of the virtual infrastructure to define a second logical network and connect the second logical network to the first logical network,
    wherein the first and second logical networks use a same data model and wherein the set of second-level users is restricted from viewing configuration of the first logical network; and
    receiving input from the particular second-level user of the virtual infrastructure to create accounts for a set of one or more third-level users of the virtual infrastructure, wherein the set of third-level users of the virtual infrastructure is enabled to define logical networks that connect to one or more of the first and second logical networks.

10. The method of claim 9, wherein the set of third-level users is restricted from viewing configurations for the first and second logical networks as well as the logical networks of other third-level users.

11. The method of claim 9, wherein the logical networks defined by the set of third-level users uses the same data model as the first and second logical networks.

12. The method of claim 9, wherein the second logical network is deployed within a first virtual cloud, wherein at least one of the third-level users defines a third logical network within a second virtual cloud.

13. The method of claim 12, wherein the virtual clouds provide isolation from other logical networks within the virtual infrastructure.

14. For a network management and control system that manages a virtual infrastructure deployed across a set of datacenters, a method comprising:
- based on input from a top-level user of the virtual infrastructure, (i) deploying a first logical network within the virtual infrastructure and (ii) defining a set of one or more second-level users of the virtual infrastructure; and
- receiving input from a particular second-level user of the virtual infrastructure to define a second logical network and connect the second logical network to the first logical network,
- wherein the first and second logical networks use a same data model and wherein the set of second-level users is restricted from viewing configuration of the first logical network,
- wherein the top-level user is enabled to view and configure physical infrastructure entities that are hidden from the set of second-level users,
- wherein the logical network definitions are stored as policy trees, wherein the policy tree for the first logical network comprises physical infrastructure nodes defining the physical infrastructure of different sites, and
- wherein the policy tree for the second logical network is restricted from comprising any physical infrastructure nodes.

15. A non-transitory machine-readable medium storing a network manager program which when executed by at least one processing unit manages a virtual infrastructure deployed across a set of datacenters, the network manager program comprising sets of instructions for:
- based on input from a top-level user of the virtual infrastructure, (i) deploying a first logical network within the virtual infrastructure and (ii) defining a set of one or more second-level users of the virtual infrastructure, wherein the top-level user exposes entities of the first logical network to the set of second-level users via labels that provide information to the set of second-level users about the exposed entities of the first logical network without enabling the set of second-level users to view the configuration of the first logical network entities; and
- receiving input from a particular second-level user of the virtual infrastructure to define a second logical network and connect the second logical network to the first logical network,
- wherein the first and second logical networks use a same data model and wherein the set of second-level users is restricted from viewing configuration of the first logical network.

16. The non-transitory machine-readable medium of claim 15, wherein the top-level user is an administrator for a provider of the virtual infrastructure and the set of second-level users includes administrators for tenants of the virtual infrastructure.

17. A non-transitory machine-readable medium storing a network manager program which when executed by at least one processing unit manages a virtual infrastructure deployed across a set of datacenters, the network manager program comprising sets of instructions for:
- based on input from a top-level user of the virtual infrastructure, (i) deploying a first logical network within the virtual infrastructure and (ii) defining a set of one or more second-level users of the virtual infrastructure;
- receiving input from a particular second-level user of the virtual infrastructure to define a second logical network and connect the second logical network to the first logical network,
- wherein the first and second logical networks use a same data model and wherein the set of second-level users is restricted from viewing configuration of the first logical network; and
- receiving input from the particular second-level user of the virtual infrastructure to create accounts for a set of one or more third-level users of the virtual infrastructure,
- wherein the set of third-level users of the virtual infrastructure is enabled to define logical networks that connect to one or more of the first and second logical networks, and
- wherein the logical networks defined by the set of third-level users uses the same data model as the first and second logical networks.

18. The non-transitory machine-readable medium of claim 17, wherein:
- the second logical network is deployed within a first virtual cloud; and
- at least one of the third-level users defines a third logical network within a second virtual cloud, wherein the virtual clouds provide isolation from other logical networks within the virtual infrastructure.

19. A non-transitory machine-readable medium storing a network manager program which when executed by at least one processing unit manages a virtual infrastructure deployed across a set of datacenters, the network manager program comprising sets of instructions for:
- based on input from a top-level user of the virtual infrastructure, (i) deploying a first logical network within the virtual infrastructure and (ii) defining a set of one or more second-level users of the virtual infrastructure;
- receiving input from a particular second-level user of the virtual infrastructure to define a second logical network and connect the second logical network to the first logical network,
- wherein the first and second logical networks use a same data model and wherein the set of second-level users is restricted from viewing configuration of the first logical network,
- wherein the top-level user is enabled to view and configure physical infrastructure entities that are hidden from the set of second-level users,
- wherein the logical network definitions are stored as policy trees,
- wherein the policy tree for the first logical network comprises physical infrastructure nodes defining the physical infrastructure of different sites, and
- wherein the policy tree for the second logical network is restricted from comprising any physical infrastructure nodes.

* * * * *